US009715317B2

(12) United States Patent
Park

(10) Patent No.: US 9,715,317 B2
(45) Date of Patent: Jul. 25, 2017

(54) ELECTRONIC DEVICE USING ELECTROMAGNETIC FIELD FOR USER INPUT

(71) Applicant: Samsung Electronics Co., Ltd., Gyeonggi-do (KR)

(72) Inventor: Jea-Woo Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/739,151

(22) Filed: Jun. 15, 2015

(65) Prior Publication Data

US 2015/0370384 A1    Dec. 24, 2015

(30) Foreign Application Priority Data

Jun. 20, 2014 (KR) .................. 10-2014-0075730

(51) Int. Cl.
*G06F 3/041* (2006.01)
*G06F 3/044* (2006.01)
*G06F 3/038* (2013.01)

(52) U.S. Cl.
CPC .............. *G06F 3/044* (2013.01); *G06F 3/038* (2013.01); *G06F 2203/04108* (2013.01)

(58) Field of Classification Search
CPC ................ G06F 3/038; G06F 3/044; G06F 2203/04108; G06F 3/046; G06F 3/0412
See application file for complete search history.

(56) References Cited

U.S. PATENT DOCUMENTS

| | | | | |
|---|---|---|---|---|
| 9,223,450 B2* | 12/2015 | Heo | ....................... | G06F 3/0416 |
| 2013/0033450 A1* | 2/2013 | Coulson | .................. | G06F 3/044 |
| | | | | 345/174 |
| 2013/0147833 A1 | 6/2013 | Aubauer et al. | | |
| 2013/0176236 A1 | 7/2013 | Ivanov | | |
| 2013/0194519 A1 | 8/2013 | Ivanov | | |
| 2015/0160754 A1* | 6/2015 | Wenzel | ................... | G06F 3/044 |
| | | | | 345/174 |

FOREIGN PATENT DOCUMENTS

KR    10-2013-0001724 A    1/2013

\* cited by examiner

*Primary Examiner* — Nelson Rosario
(74) *Attorney, Agent, or Firm* — Cha & Reiter, LLC

(57) ABSTRACT

An electronic device may include a multi-layer panel, a first upper electrode and a first lower electrode disposed in different respective layers of the multi-layer panel, a second upper electrode and a second lower electrode disposed in different layers respectively of the multi-layer panel. A first controller may detect a touch input by detecting a change in an electromagnetic field between the first upper electrode and the first lower electrode. A second controller may detect a hovering input by detecting a change in an electromagnetic field between the second upper electrode and the second lower electrode.

20 Claims, 20 Drawing Sheets

ELECTRONIC DEVICE USING ELECTROMAGNETIC FIELD FOR USER INPUT

CLAIM OF PRIORITY

The present application claims the benefit under 35 U.S.C. §119(a) of a Korean patent application filed on Jun. 20, 2014 in the Korean Intellectual Property Office and assigned Serial No. 10-2014-0075730, the entire disclosure of which is hereby incorporated by reference.

TECHNICAL FIELD

The present disclosure relates generally to an electronic device that receives a user input using an electromagnetic field.

BACKGROUND

As electronics and communication technologies advance, a user device (e.g., a smart phone, tablet computer, notebook computer, etc.) has become a personal necessity in modern life and an important means for fast-changing information delivery. Such a user device facilities a user task in a Graphical User Interface (GUI) environment using a touch screen or touch pad, and offers various multimedia based on a web environment.

User devices include various electronic parts for a variety of functions. For example, a user device may include a stereo speaker module for playing music in stereo sound, a camera module for photography, a communication module for communicating with other electronic device over a network, and so forth. A user device also includes various input devices for receiving a user input.

SUMMARY

It is an aspect of the present disclosure to provide an input device for employing different input methods (e.g., both touch contact input and contactless input).

Another aspect of the present disclosure is to provide an input device that may be easily fabricated and mounted in a user device.

In accordance with an aspect of the present disclosure, an electronic device includes a multi-layer panel. A first upper electrode and a first lower electrode are disposed in different respective layers respectively of the multi-layer panel. A second upper electrode and a second lower electrode are disposed in different respective layers of the multi-layer panel. A first controller is configured to detect a touch input by detecting a change in an electromagnetic field between the first upper electrode and the first lower electrode. A second controller is configured to detect a contactless user input by detecting a change in an electromagnetic field between the second upper electrode and the second lower electrode.

In accordance with another aspect of the disclosure, a method for detecting user inputs in an electronic device having a keyboard and a touchpad is provided. The method involves initially recognizing a contactless input by detecting a presence of a user appendage in proximity to a top surface of the touchpad at a region of the touchpad at which an electromagnetic field for contactless interaction is generated. The contactless input may be processed as a gesture input if the presence of the user appendage is detected for less than or equal to a threshold period of time. The contactless input may be ignored if the presence of the appendage is detected for greater than the threshold period of time. In the latter case, the contactless input may be recognized as an unintentional input, so that the keyboard may be utilized unimpeded.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
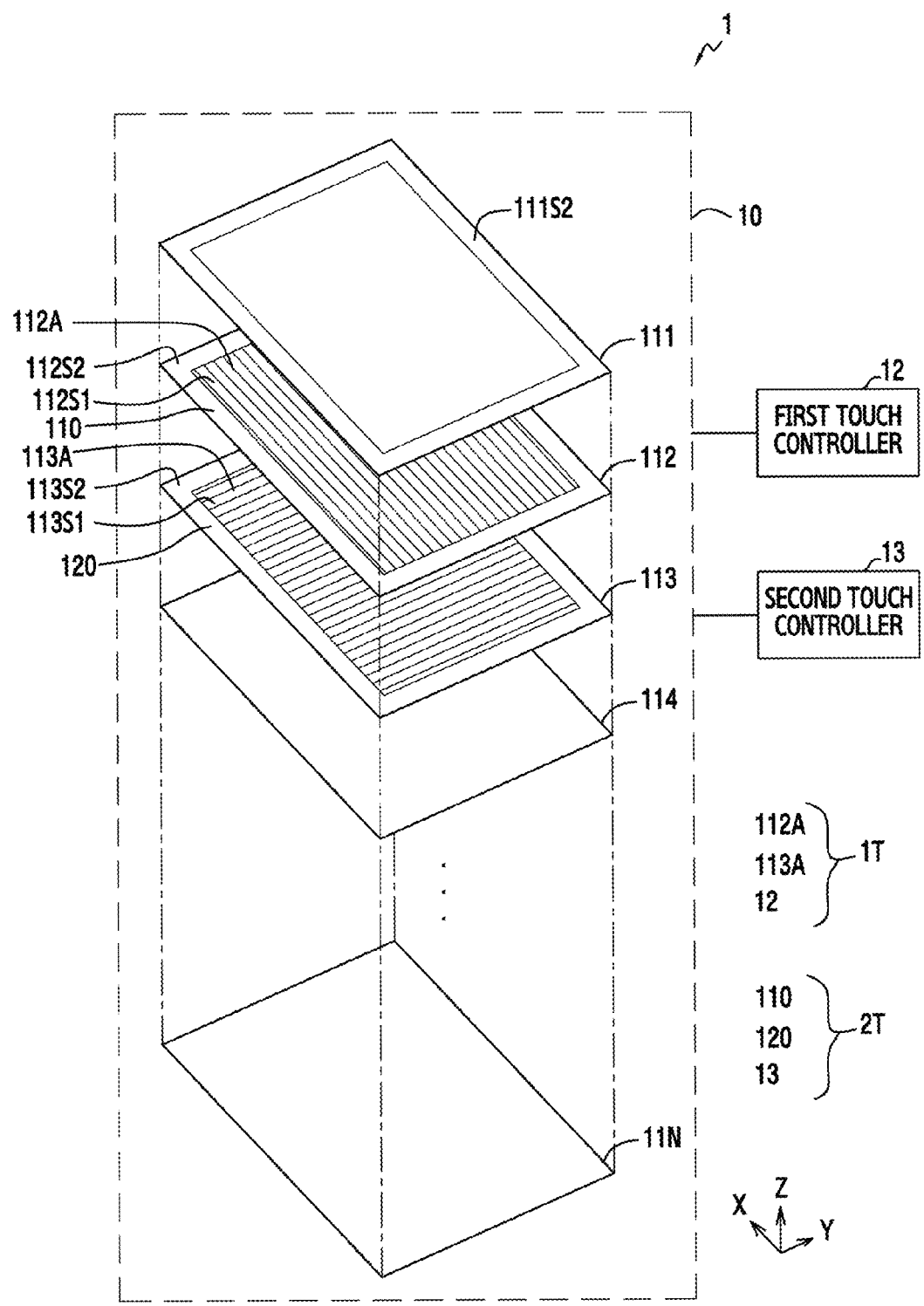
FIG. 1 illustrates an input device according to an embodiment of the present disclosure.

The following description with reference to the accompanying drawings is provided to assist in a comprehensive understanding of various embodiments of the disclosure as defined by the claims and their equivalents. The description includes various specific details to assist in that understanding but these are to be regarded as merely exemplary. Accordingly, those of ordinary skill in the art will recognize that various changes and modifications of the embodiments described herein may be made without departing from the scope and spirit of the claimed subject matter as defined by the appended claims. In addition, descriptions of well-known functions and constructions may be omitted for clarity and conciseness.

As used in the present disclosure, terms such as "include", "may include", etc. refer to the presence of the corresponding function, operation or feature, and do not limit the presence of additional functions, operations or features. Also, terms such as "include", "have", etc. as used in the present disclosure refers to the presence of characteristics, numbers, steps, operations, components or combinations thereof, and is not intended to exclude one or more additional characteristics, numbers, steps, operations, components or combinations thereof As used in the present disclosure, the term "or", etc. is used to include any and all combination of terms listed. For examples, "A or B" includes only A, only B, or both A and B.

As used in the present disclosure, terms such as "first", "second", etc. may be used to describe various features, but do not limit such features. For example, the terms do not limit the order and/or the importance of their associated features. Such terms may be used to differentiate one feature from another. For example, a first user equipment (alternatively, "UE") and a second user equipment are both user equipment, but are different user equipment. For example, without departing from the scope of the present disclosure, a first component may be called a second component, and likewise, a second component may be called a first component.

If a component is said to be "connected with" or "connected to" another component, the component may be directly connected with, or connected to, the other component, or another component may exist in between. On the other hand, if a component is said to be "directly connected with" or "directly connected to" another component, it should be understood that no components exist in between.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Unless defined otherwise, all terms used herein have the same meaning as commonly understood by those of skill in the art. Such terms as those defined in a generally used dictionary are to be interpreted to have the meanings equal to the contextual meanings in the relevant field of art, and are not to be interpreted to have ideal or excessively formal meanings unless clearly defined in the present specification.

An electronic device according to an embodiment of the present disclosure may be a device including communication functionality. For example, the electronic device may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group Audio Layer 3 (MP3) player, a mobile medical appliance, a camera, and a wearable device (e.g., a Head Mounted Device (HMD) such as electronic glasses, electronic textiles, an electronic bracelet, an electronic necklace, an electronic appcessory, an electronic tattoo, and a smart watch).

According to various embodiments, an electronic device may be a smart home appliance having the communication functionality. The smart home appliance may include, for example, at least one of a television, a Digital Video Disk (DVD) player, an audio system, a refrigerator, an air conditioner, a vacuum cleaner, an oven, a microwave oven, a washing machine, an air purifier, a set-top box, a TV box (e.g., Samsung HomeSync™, AppleTV™, or Google TV™), a game console, an electronic dictionary, a digital key, a camcorder, and a digital frame.

According to various embodiments, an electronic device may include at least one of various medical appliances (e.g., Magnetic Resonance Angiography (MRA), Magnetic Resonance Imaging (MRI), Computed Tomography (CT), X-ray system, ultrasonicator)), a navigation device, a Global Positioning System (GPS) receiver, an Event Data Recorder (EDR), a Flight Data Recorder (FDR), an in-vehicle infotainment device, marine electronic equipment (e.g., marine navigation device and gyro compass), an avionic system, a security device, a vehicle head unit, an industrial or home robot, an Automatic Teller Machine (ATM) of a financial company, and a Point of Sale (POS) of a store.

According to various embodiments, an electronic device may include at least one of part of furniture or building/structure having the communication functionality, an electronic board, an electronic signature receiving device, a projector, and various gauges (e.g., gauges for water, electricity, gas, and radio waves). An electronic device according to various embodiments of the present disclosure may be one or a combination of those various devices. The electronic device may be a flexible device. Also, those skilled in the art should understand that the electronic device is not limited to those devices.

Hereinafter, various embodiments of the present disclosure provide an electronic device by referring to the attached drawings. The term 'user' used in embodiments of the present disclosure may represent a person or a device (e.g., an artificial intelligent electronic device) who or which uses the electronic device.

FIG. 1 depicts an input device, 1, according to an embodiment of the present disclosure. The input device 1 may include a panel 10, a first touch controller 12, and a second touch controller 13. The panel 10 may include multiple layers 111 through 11N (where N may be any integer), each having a major surface in an x-y plane, and stacked in the z direction.

Various ways of forming and stacking the layers 111-111N are available. For instance, a given layer may be attached to a higher layer or a lower layer. (A higher layer may be considered a layer closer to a top layer (111) with which a user may interact.) A given layer may also be separated from a higher layer or a lower layer. A given layer and a higher layer or a lower layer may be insulated. For example, a surface of the layer may be coated with an insulating layer. A given layer may cover a whole or a part of a lower layer. A plurality of layers may also have different thicknesses.

The panel 10 may include a first upper electrode and a first lower electrode, which may be disposed in different layers. As explained in detail below, the first upper electrode be comprised of an array of electrode lines oriented in the x or y direction, and the first lower electrode may comprised of an array of electrode lines oriented in the other of the x or y direction, such that the first upper and first lower electrodes form a matrix. This matrix may then be used to detect touch contact type user inputs at specific points along the surface of the top layer 111 of the input device 1. Also as described further below, a second electrode pair comprised of a second upper electrode and a second lower electrode disposed in different respective layers, may be provided for detecting contactless user inputs, i.e., "non-contact touch inputs" which are made by user gestures proximate to the top surface of input device 1. The matrix formed by the first upper and first lower electrode pairs may also be used to detect certain contactless inputs.

The first upper electrode may be disposed above the first lower electrode. At least one layer may be interposed between a layer including the first upper electrode and a layer including the first lower electrode. Alternatively, at least one layer may not be disposed between the layer including the first upper electrode and the layer including the first lower electrode.

For example, one layer 112 of the panel 10 may include an array 112A of multiple x electrode lines, which together form the first upper electrode. The x electrode lines may be spaced at equal distances in a y-axis direction. Another layer 113 of the panel 10 may include an array 113A of multiple y electrode lines which form the first lower electrode. The y electrode lines may be spaced at equal distances in an x-axis direction. The array 112A of the x electrode lines and the array 113A of the y electrode lines may overlay one another in the z-axis direction to form a matrix.

The layers 112, 113 including the respective x and y electrode lines may be arranged in various ways. For instance, layer 112 may be disposed above layer 113, as shown in FIG. 1, but alternatively layer 112 may be disposed below layer 113. According to an embodiment, no layer may be interposed between the layers 112, 113. Alternatively, although not depicted, at least one layer may be interposed between layers 112 and 113.

The layer 112 may include a first area 112S1 and a second area 112S2. The array 112A of the x electrode lines may be disposed in the first area 112S1. The first area 112S1 may be disposed inside the second area 112S2 as shown in FIG. 1. The second area 112S2 may surround the first area 112S1 and may have a picture frame shape (rectangular ring). In other embodiments, the second area 112S2 may be a generally rectangular region disposed on just one side of the first area (see e.g. FIG. 4). Other geometries and arrangements are possible.

The layer 113 including the array 113A of the y electrode lines may include a first area 113S1 and a second area 113S2. The array 113A may be disposed in the first area 113S1. The first area 113S1 may correspond to the first area 112S1 of the layer 112, and the second area 113S2 may correspond to the second area 112S2. In other words, when layers 112, 113 are stacked in the z direction, first area 112S1 may overlay first area 113S1, and second area 112S2 may overlay second area 113S2.

By connecting the arrays 112A and 113A to a voltage source, a first electromagnetic field may be generated between the array 112A of the x electrode lines and the array 113A of the y electrode lines.

The first touch controller 12 may obtain a touch input signal (also referred to herein interchangeably as a "touch contact" or "contact touch" input signal) from a change of the first electromagnetic field, using a projected capacitive touch (PCT) technique. For example, a user's finger is capacitive, and when the user's finger approaches the first electromagnetic field, energy relating to the electromagnetic field changes at the point of touch contact at the top surface of the panel 10. The first upper and first lower electrodes may act as electrodes of a capacitor, and electric charge stored between the electrodes at the point of contact may be transferred to the user's finger at the point of contact, thus changing the effective capacitance and the electromagnetic field between the electrodes. The first touch controller 12, which may complete electronic circuits between the x electrode lines array and the y electrode lines array, may detect this change at the coordinate point of contact, and may output the touch input signal based on the capacitance/electromagnetic field change detected to occur at the point of contact. The touch input indicates an input corresponding to a gesture which touches the panel 10 with the user's finger.

According to an embodiment, the first touch controller 12 may be configured to obtain a contactless input signal, also referred to herein as a "non-contact touch input signal" from a smaller change of the first electromagnetic field. For example, when the user's finger approaches the first electromagnetic field, the capacitance relating to the electromagnetic field changes and the first touch controller 12 may output the non-contact touch input signal based on the capacitance/electromagnetic field change. The non-contact touch input indicates an input corresponding to a gesture applied to the panel 10 without contacting the user's finger against the top surface of the panel 10.

The first upper electrode (e.g., the array 112A of the x electrode lines), the first lower electrode (e.g., the array 113A of the y electrode lines), and the first touch controller 12 may be connected in a circuit and referred to as a first input device 1T.

According to an embodiment, at least one layer of the panel 10 may be disposed above the layers 112, 113. For example, one layer (e.g., the layer 111) may be disposed at the top of the panel 10 and referred to as a cover layer. The cover layer 111 may be transparent or opaque. The cover layer 111 may form at least part of a side of the user device (typically a top side, but lateral and rear sides are also possible).

According to an embodiment, at least one layer of the panel 10 may include, for example, a side for a ground (e.g., a ground plane, a ground surface, a ground plate, or a ground pad), and may be referred to as a ground layer. The ground layer (e.g., the layer 114) may be disposed below the layers 112, 113. If the input device 1 is configured as a touch pad, the ground layer 114 may typically be included. If the input device is configured as touch screen, a display layer may be interposed between the ground layer 114 and the third layer 113.

According to an embodiment, at least one layer (e.g. 11N) of the panel 10 may include an electronic part (e.g., an Integrated Circuit (IC), a microphone condenser, a resistor, an inductor, or a connection line) and may be referred to as an electronic part layer or an electronic part board. The electronic part layer 11N may be disposed below the ground layer (e.g., 114). The first touch controller 12 or the second touch controller 13 may be disposed in the electronic part layer 11N. The electronic part layer or at least one layer connected thereto may be referred to as a Printed Circuit Board (PCB) or a Printed Board Assembly (PBA).

At least one layer of the panel 10 may include a dielectric and be referred to as a dielectric layer. Although not depicted, the dielectric layer may be interposed between the layers 112 and 113 having the x and y electrode lines.

The panel 10 may further include a second upper electrode 110 and a second lower electrode 120. The second upper electrode 110 may be disposed above the second lower electrode 120. The second upper electrode 110 and the second lower electrode 120 may be disposed in different respective layers. At least one layer may be interposed between a layer including the second upper electrode 110 and a layer including the second lower electrode 120. Alternatively, at least one layer may not be interposed between these layers.

The second upper electrode 110 may be disposed in the panel 10 in various ways, such as in the cover layer 111 as illustrated in the example of FIG. 1. Here, the second upper electrode 110 may be disposed in an area 111S2 not overlapping with the array 112A of the x electrode lines.

According to another embodiment, the second upper electrode 110 may be disposed in the layer 112 including the array 112A of the x electrode lines. Here, the second upper electrode 110 may be disposed in the second area 112S2.

In still another embodiment, the second upper electrode 110 may be disposed in the layer 113 including the array 113A of the y electrode lines. In this case, the second upper electrode 110 may be disposed in the second area 113S2.

According to yet another embodiment, the second upper electrode 110 may be disposed in the ground layer 114. Here, the second upper electrode 110 may be disposed in an area (not shown in FIG. 1) without a ground plane. For instance, if the ground plane is in a central area of ground layer 114, the electrode 110 may be disposed in an edge area electrically isolated from the central, ground plane area.

According to a further embodiment, the second upper electrode 110 may be disposed in the electronic part layer.

According to an embodiment, the second lower electrode 120 may be disposed in the layer 112 including the array 112A of the x electrode lines. In this case, the second lower electrode 120 may be disposed in the second area 112S2. The second lower electrode 120 may not overlap the array 113A of the y electrode lines.

According to another embodiment, the second lower electrode 120 may be disposed in the layer 113 including the array 113A of the y electrode lines. Here, the second lower electrode 120 may be disposed in the second area 113S2. The second lower electrode 120 may not overlap the array 112A of the x electrode lines.

According to still an embodiment, the second lower electrode 120 may be disposed in the ground layer 114. In this example, the second lower electrode 120 may be disposed in an area (not shown) without a ground plane, such as an edge area isolated from a centrally disposed ground plane area.

According to yet an embodiment, the second lower electrode 120 may be disposed in the electronic part layer.

A second electromagnetic field may be generated between the second upper electrode 110 and the second lower electrode 120. The second touch controller 13 may obtain a touch contact input signal from a change of the second electromagnetic field. For example, when the user's finger, which is capacitive, touches a top surface of the input device 1 and thereby becomes close to the second electromagnetic field, energy relating to the electromagnetic field changes. The second touch controller 13 may detect this change via a change in voltage or current in a circuit to which the second upper electrode 110 and the second lower electrode 120 are connected. The second controller 13 may output the touch contact input signal based on the change.

Additionally, the second touch controller 13 may obtain a contactless input signal ("non-contact touch" input signal) from a smaller change of the second electromagnetic field due to the capacitance of the user's finger. For example, when the user's finger becomes close to the second electromagnetic field (but does not touch the top surface of the input device 1), the charge related to the electromagnetic field changes and the second touch controller 13 may detect the change and in response output the non-contact touch input signal.

Unlike the first upper and lower electrodes, the second upper electrode 110 and the second lower electrode 110 may not form a matrix of a pair of arrays. Instead, these electrodes may each be embodied as a single strip of metal, or several strips of metal. Thus, an electromagnetic field disturbance between the electrodes due to capacitance of a user's finger may be detectable as a disturbance that occurred anywhere along the strip of metal, rather than at precise x-y coordinate as in the case of a matrix. This distinction, applicable to some embodiments, will become apparent below. In other embodiments, the second electrodes do form a matrix to enable precise x-y coordinate detection.

The second upper electrode 110, the second lower electrode 120, and the second touch controller 13 may be part of a common circuit and referred to as a second input device 2T.

The first touch controller 12 and the second touch controller 13 may be part of a common controller. For example, a system semiconductor (e.g., a System-on-Chip (SoC)) may process the functions of the first touch controller 12 and the second touch controller 13.

The input device 1 may be mounted in a user device and provide the touch contact input and/or non-contact touch input signal to a controller (e.g., an Application Processor (AP)) of the user device. Accordingly, the user device equipped with the input device 1 may be configured to receive both touch inputs and contactless inputs. The latter also may be referred to as "hovering" inputs.

Figure 2:
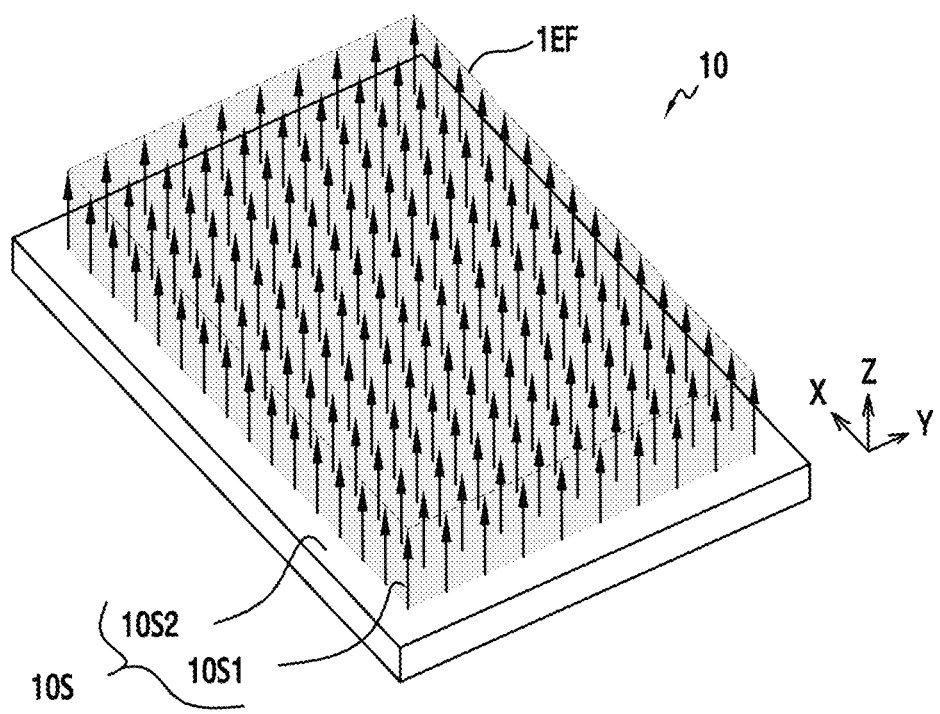
FIG. 2 illustrates a panel according to an embodiment of the present disclosure.

FIG. 2 depicts a panel according to an embodiment of the present disclosure. As shown in FIG. 2, a panel 10 may include a side 10S for receiving a touch input (e.g., a first touch input or a second touch input). The side 10S may be disposed on one side of a user device (e.g., a user device as in FIG. 14).

The side 10S may include a first electromagnetic field area 10S1 and a second electromagnetic field area 10S2. The first electromagnetic field region 10S1 may be centrally disposed, and surrounded by the second electromagnetic field region 10S2 (corresponding to the case where the second region 10S2 is in the form of a picture frame or ring).

A first electromagnetic field 1EF may be generated between a first upper electrode (e.g., the array 112A of the x electrode lines in FIG. 1) and a first lower electrode (e.g., the array 113A of the y electrode lines in FIG. 1). A portion of the first electromagnetic field 1EF may be emitted through the first electromagnetic field region 10S1. The first electromagnetic field 1EF may be distributed evenly over the first electromagnetic field region 10S1.

Figure 3:
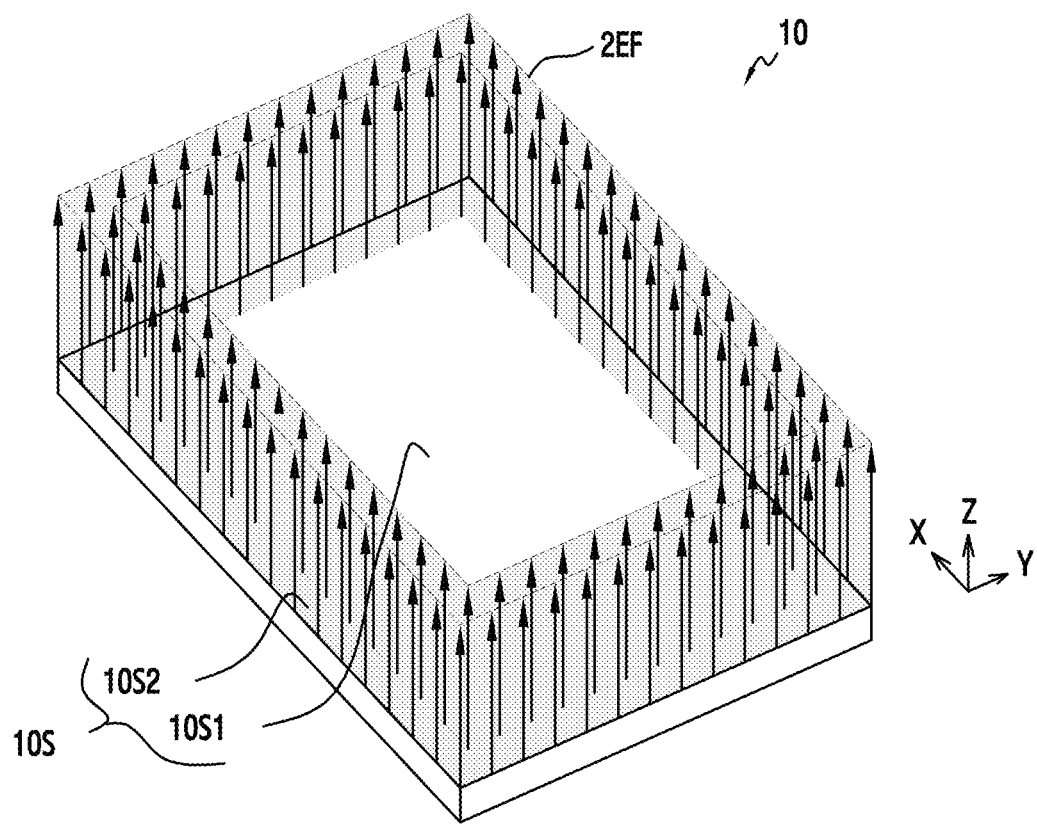
FIG. 3 illustrates a panel according to an embodiment of the present disclosure.

FIG. 3 depicts a panel 10 according to an embodiment of the present disclosure, which may be the same panel as shown in FIG. 2 or FIG. 1. A second electromagnetic field 2EF may be generated between the second upper electrode 110 and the second lower electrode 120 as mentioned above in connection with FIG. 1. A portion of the second electromagnetic field 2EF may be emitted through the second electromagnetic field region 10S2. The second electromagnetic field 2EF may be distributed evenly over the second electromagnetic field region 10S2.

A magnitude of the second electromagnetic field 2EF may differ from a magnitude of the first electromagnetic field 1EF of FIG. 2. For example, the magnitude of the second electromagnetic field 2EF may be greater than the magnitude of the first electromagnetic field 1EF. The second electromagnetic field 2EF may be distributed higher than the first electromagnetic field 1EF in a z-axis direction.

Figure 4:
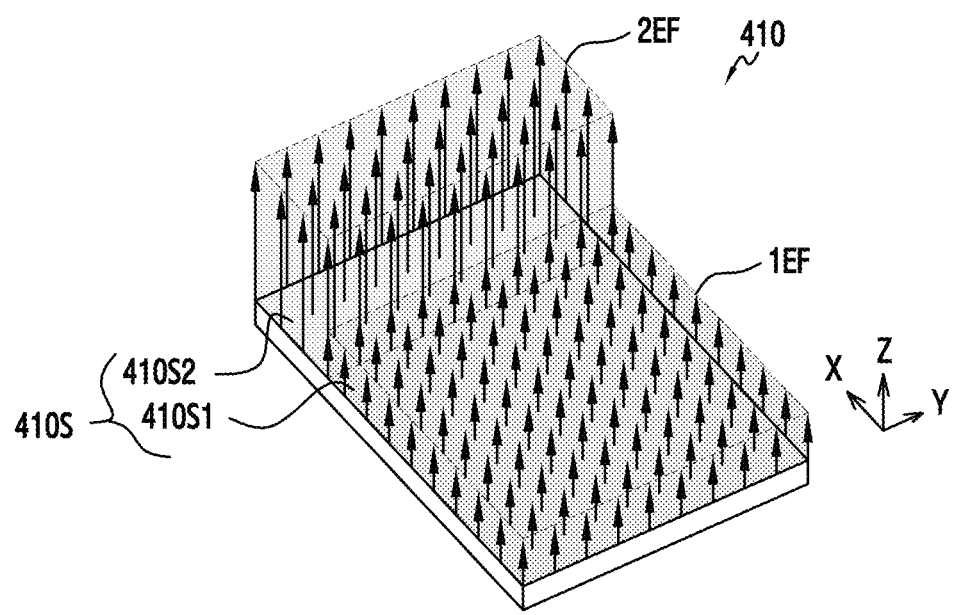
FIG. 4 illustrates a panel according to another embodiment of the present disclosure.

FIG. 4 depicts a panel, 410, according to another embodiment of the present disclosure. Panel 410 may include a side 410S for a touch (and contactless) input (e.g., a first touch input or a second touch input). The side 410S may include a first electromagnetic field region 410S1 and a second electromagnetic field region 410S2. The first electromagnetic field region 410S1 may be disposed beside the second electromagnetic field region 410S2, and may have a generally rectangular geometry rather than a picture frame. The first electromagnetic field region 410S1 may have a greater area than the second electromagnetic field region 410S2.

A first electromagnetic field 1EF may be emitted through the first electromagnetic field region 410S1. A second electromagnetic field 2EF may be emitted through the second electromagnetic field region 410S2. A magnitude of the second electromagnetic field 2EF may be greater than a magnitude of the first electromagnetic field 1EF. Thus, for example, a gesture made by a user's finger or hand at a certain height from the surface of panel 410 may be detected as a change of the second electromagnetic field 2EF but not the first electromagnetic field 1EF.

Figure 5:
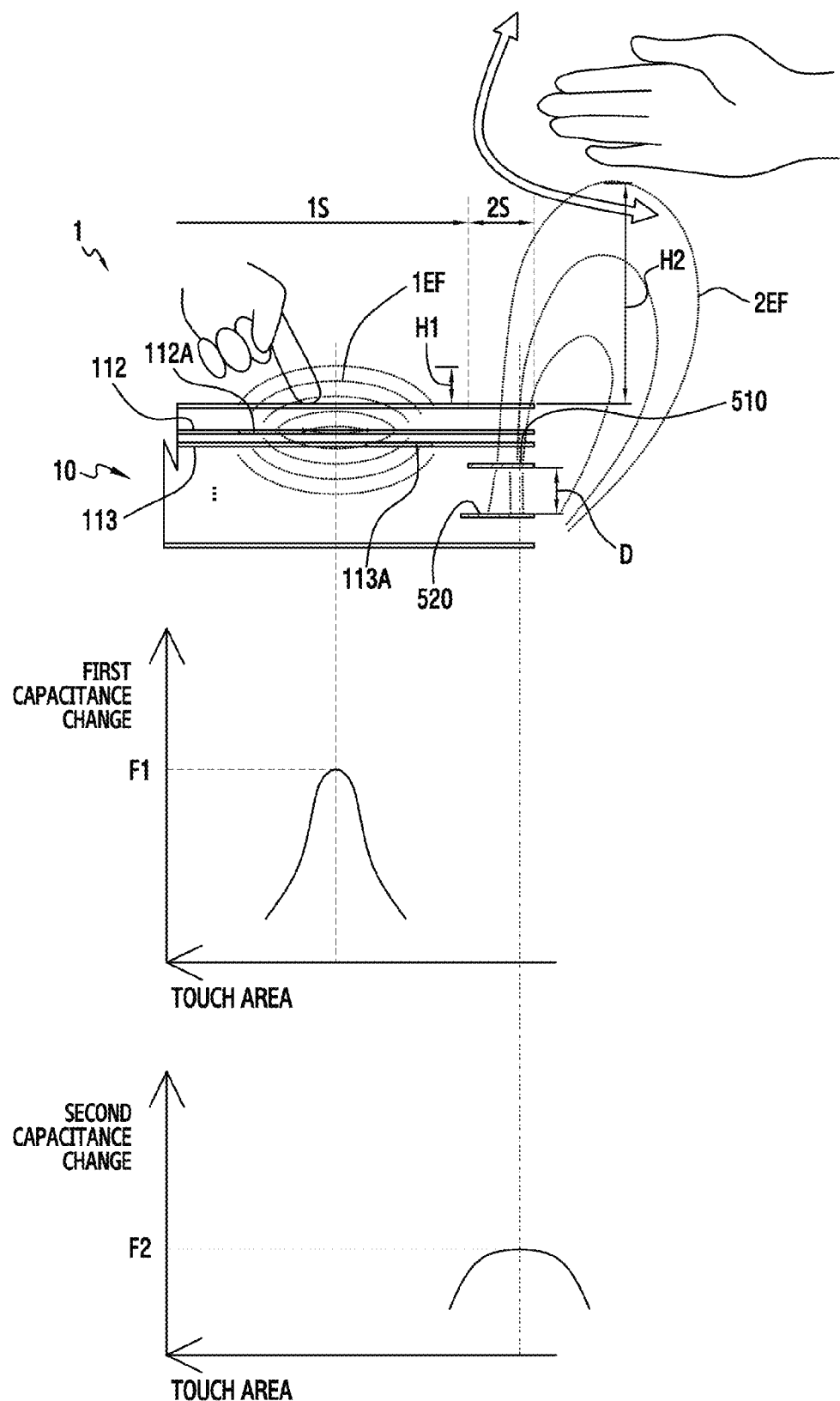
FIG. 5 illustrates a touch input according to an embodiment of the present disclosure.

FIG. 5 depicts examples of touch inputs to an input device according to an embodiment of the present disclosure. A panel 10 of FIG. 5 may generate the first electromagnetic field 1EF and/or the second electromagnetic field 2EF. The first input device 1T of FIG. 1 may produce the first electromagnetic field 1EF through a first panel area 1S of the panel 10. As described above, the first electromagnetic field 1EF may be generated between the first upper electrode (e.g., the array 112A of the x electrode lines in FIG. 1) and the first lower electrode (e.g., the array 113A of the y electrode lines in FIG. 1).

When the user's finger enters the first electromagnetic field 1EF, a first capacitance in a circuit with the first touch controller 12 may change. The first touch controller 12 of FIG. 1 may calculate two-dimensional coordinates (x, y) based on the change of the first capacitance. Alternatively, the first touch controller 12 may calculate three-dimensional (i.e., spatial) coordinates (x, y, z) based on a change of the first capacitance. For example, when the change of the first capacitance reaches a first threshold F1, the first touch controller 12 may determine that the user's finger is at a distance of H1 from the panel 10.

The first input device 1T may be configured as a device for receiving the contact touch input. For example, when the change of the first capacitance reaches the first threshold F1, the first touch controller 12 may determine that a desired contact touch input has occurred, and calculate two-dimensional coordinates (x, y). Even though the first threshold F1 may be reached when the user's finger is at a distance H1 from the panel 10, when a preset change of the first capacitance arises, the first touch controller 12 may recognize the change in electromagnetic field as a contact touch input. Here, the distance H1 between the user's finger and the panel 10 may be too short to be estimated by the user, or it may be zero (that is, the user may understand that only a direct contact with the device surface may be recognized as an input). When the preset change of the first capacitance does not arise, the first touch controller 12 may recognize no contact touch input.

A second input device 2T may generate the second electromagnetic field 2EF through a second area 2S of the panel 10. For example, the second electromagnetic field 2EF may be generated between a second upper electrode 510 and a second lower electrode 520. (The electrodes 510, 520 are comparable to the electrodes 210, 220 of FIG. 1, but are illustrated in FIG. 5 as being disposed in lower layers of the stack. Alternatively, they may be disposed in the same layers as the electrodes 210, 220 shown in FIG. 1.). The second upper electrode 510 may be disposed in one (not shown) of multiple layers of the panel 10. The second lower electrode 520 may be disposed in a layer (not shown) below the layer including the second upper electrode 510. At least one layer may be or may not be disposed between the layer including the second upper electrode 510 and the layer including the second lower electrode 520.

A distance D between the second upper electrode 510 and the second lower electrode 520 may act as a variable for determining the capacitance formed by the electrodes 510, 520, and the strength of the second electromagnetic field 2EF for a given applied voltage. The distance D may be set by considering the thicknesses of the layer including the second upper electrode 510 and the layer including the second lower electrode 520. For example, the longer distance D, the smaller the capacitance formed by electrodes 510, 520. An area of the second upper electrode 510 and/or the second lower electrode 520 may also act as a variable for determining the capacitance.

When the user's finger enters the second electromagnetic field 2EF, a second capacitance may change. If the electrodes 510, 520 are comprised of x and y electrode lines which form a pair of intersecting arrays, the second touch controller 13 of FIG. 1 may calculate two-dimensional coordinates (x, y) based on the change of the second capacitance. Alternatively, the second touch controller 13 may calculate three-dimensional (i.e., spatial) coordinates (x, y, z) based on the change of the second capacitance. For example, when the change of the second capacitance reaches a second threshold F2, the second touch controller 13 may determine that the user's finger is at a distance of H2 from the panel 10. If, on the other hand, one of the second electrodes 510, 520 is a continuous ring and the other is a sectioned (discontinuous) ring, as illustrated in the similar embodiments of FIGS. 6 through 11, then the second controller 13 may detect touch inputs and/or contactless inputs as inputs that have occurred anywhere along one of the sections of the sectioned ring.

The second input device 2T may be configured and designated as a device for receiving the non-contact touch input. For example, when the change of the second capacitance reaches the second threshold F2, the second touch controller 13 may determine a desired non-contact touch input and calculate three-dimensional coordinates (x, y, z). Alternatively, when a preset change of the first capacitance preset does not arise, the second touch controller 13 may recognize the absence of the non-contact touch input.

Figure 6:
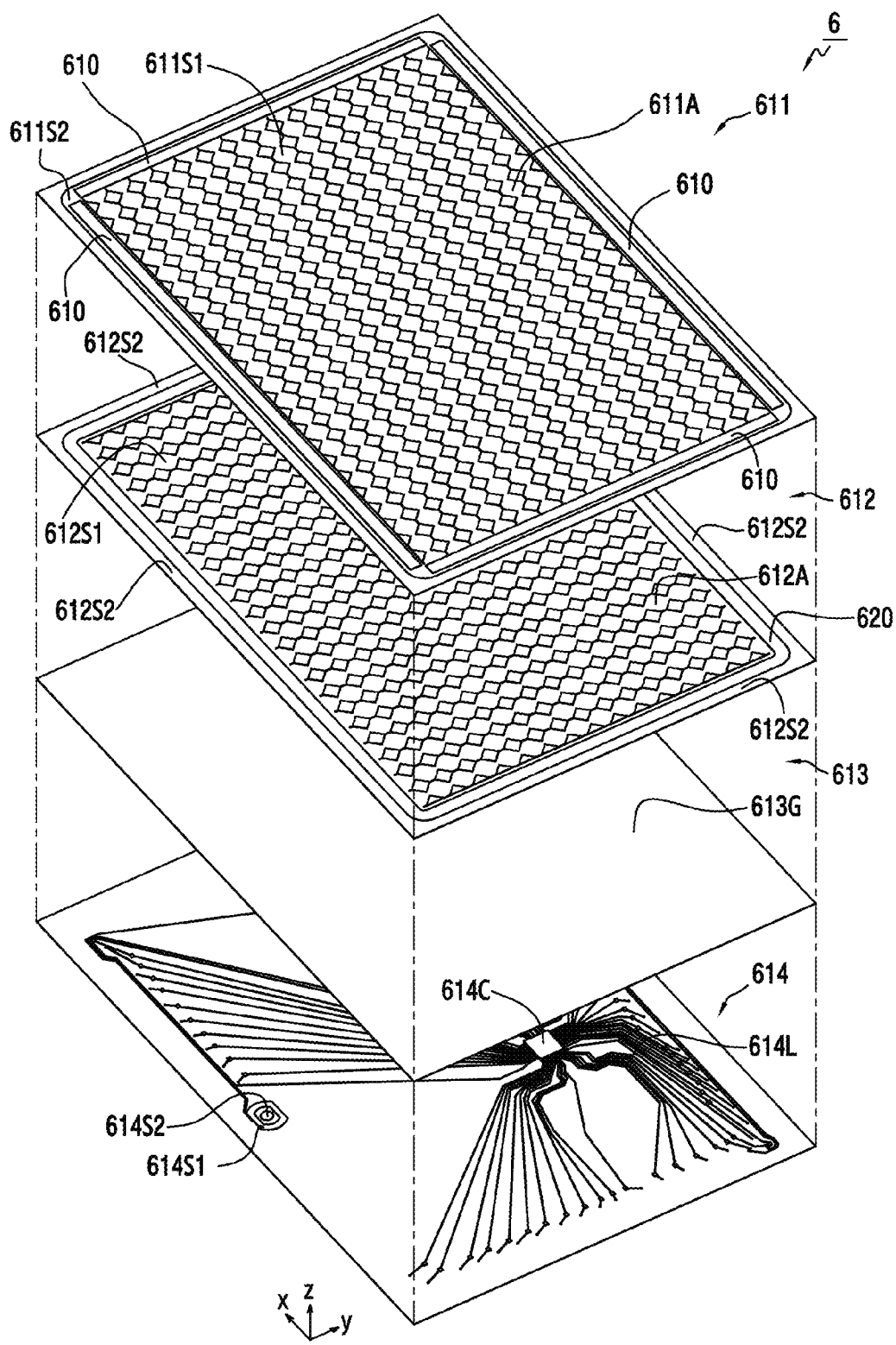
FIG. 6 illustrates an input device according to an embodiment of the present disclosure.

FIG. 6 depicts an input device, 6, according to an embodiment of the present disclosure. Input device 6 is an example of the input device 1 of FIG. 1. The input device 6 may include a first layer 611, a second layer 612, a third layer 613, and a fourth layer 614. The layers 611 through 614 may be in a quadrangular shape (e.g., a substantially rectangular shape). Input device 6 may also include a top cover layer (not shown in order to clearly illustrate the other layers) similar or identical to the cover layer 111 of FIG. 1.

The first layer 611 may include a first area 611S1 and a second area 611S2. The first area 611S1 may be substantially quadrangular. The first area 611S1 may include a first upper electrode 611A. The first upper electrode 611A may include an array of x electrode lines (e.g., the x electrode lines 112 of FIG. 1). The second area 611S2 may have a picture frame or ring shape surrounding the first area 611S1, and may be a rim area or edge area of the first layer 611. The second area 611S2 may include a second upper electrode 610. The second upper electrode 610 may be physically separated from the first upper electrode 611A. Also, the second upper electrode 610 may have an overall ring shape but comprised of several separated strips of conductive material. In the example of FIG. 6, the second upper electrode 610 is comprised of four strips, each running along one side and separated from the other strips in the corners of the rectangle. In other embodiments, the second upper strip may be an array of x or y electrode lines.

The second layer 612 may be disposed below the first layer 611 and attached to the first layer 611. The second layer 612 may include a first area 612S1 and a second area 612S2. The first area 612S1 may be substantially rectangular. Most of the first area 612S1 may overlap the first area 611S1 of the first layer 611 in the z direction. The first area 612S1 may include a first lower electrode 612A. The first lower electrode 612A may include an array of y electrode lines (e.g., the y electrode lines 113A of FIG. 1).

The second area 612S2 may be a picture frame or ring shape surrounding the first area 612S1. The second area 612S2 may overlap the second area 611S2 of the first layer 611 and include a second lower electrode 620. The second lower electrode 620 may be physically separated from the first lower electrode 612A. At least part of the second lower electrode 620 may overlap the second upper electrode 610 of the first layer 611. The second lower electrode 620 may not overlap the first upper electrode 611A of the first layer 611. Alternatively, part of the second lower electrode 620 may overlap the first upper electrode 611A of the first layer 611. The second lower electrode 620 may be configured as a continuous ring of conductive material, as illustrated in FIG. 6.

The third layer 613 may be disposed below the second layer 612 and attached to the second layer 612. The third layer 613 may be a ground layer that includes a ground plane 613G The ground plane 613G may overlap at least part of the first upper electrode 611A of the first layer 611 or at least part of the second upper electrode 610. Alternatively, the ground plane 613G may overlap at least part of the second lower electrode 612A of the second layer 612 or at least part of the second lower electrode 620. In other embodiments, a display may be used in place of the ground layer 613, or in between the ground layer 613 and the second layer 612, so that the input device 6 may comprise a touch screen.

The fourth layer 614 may be disposed below the third layer 613. The fourth layer 614 may include an electronic part(s) (e.g., an electronic part such as an IC 614C, a microphone condenser, a resistor, or an inductor and its connecting line 614L). For example, the first touch controller 12 and/or the second touch controller 13 of FIG. 1 may be disposed in the fourth layer 614. The fourth layer 614 or at least one layer connected thereto may be referred to as a PCB or a PBA.

The fourth layer 614 may include a first pad 614S1 and a second pad 614S2. The first pad 614S1 may be of a loop type. The second pad 614S2 may be disposed inside the first pad 614S1. The first pad 614S1 and the second pad 614S2 may be physically separated. A metal dome, which is not shown, may be further disposed. A rim of the metal dome may be attached to the first pad 614S1 and its top may be separated from the second pad 614S2. When the user presses a proper point of the input device 6, the metal dome is deformed and its top touches the second pad 614S2. Accordingly, the first pad 614S1 and the second pad 614S2 may be electrically connected via the metal dome. Such a structure may be referred to as a dome switch.

First electromagnetic field 1EF used for a first user input (e.g., the contact touch input) may be generated between the first upper electrode 611A and first lower electrode 612A under control of first controller 12. The second electromagnetic field 2EF used for a second user input (e.g., the non-contact touch input) may be generated between the second upper electrode 610 and second lower electrode 620 under control of second controller 13.

Figure 7:
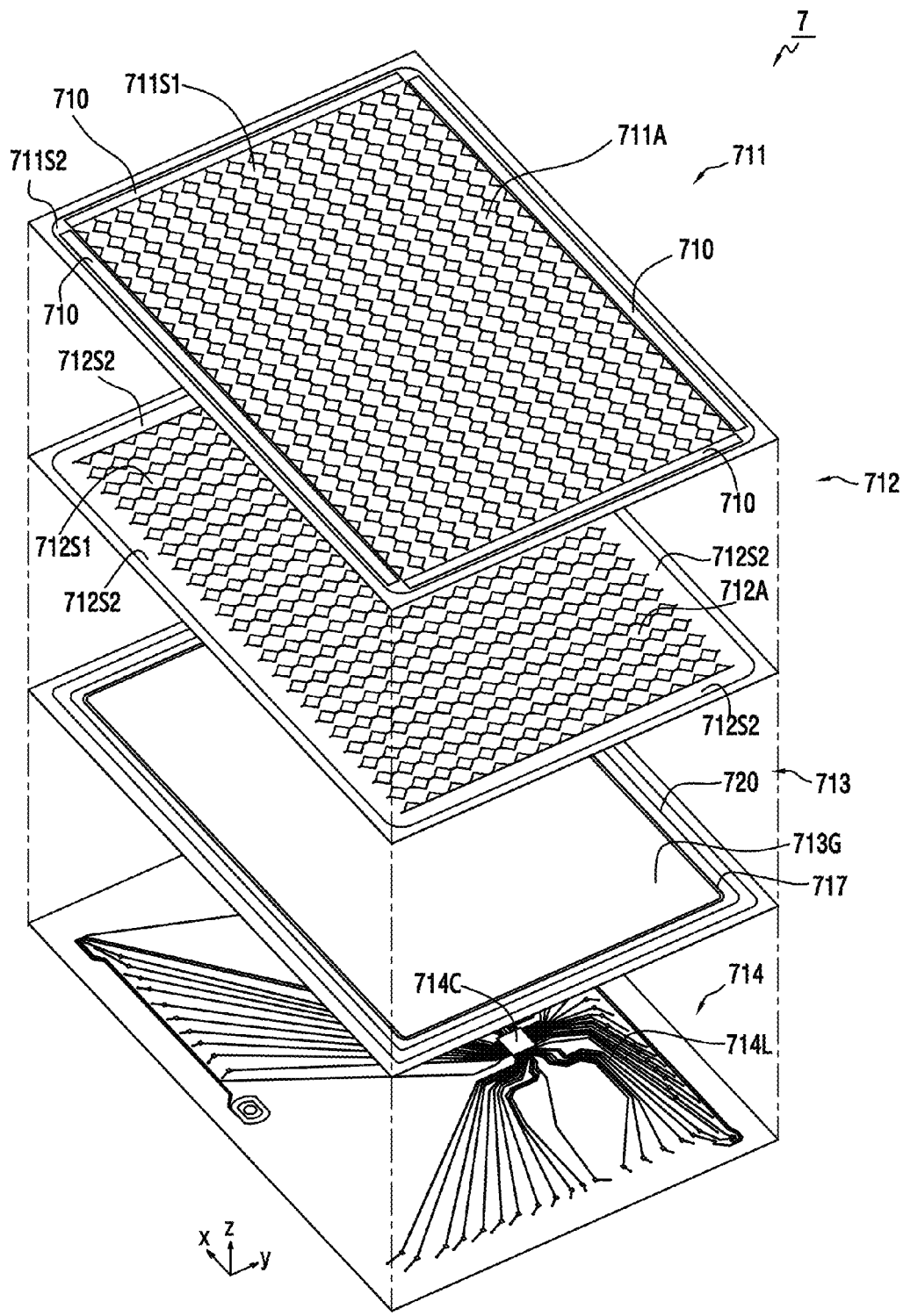
FIG. 7 illustrates an input device according to an embodiment of the present disclosure.

FIG. 7 depicts an input device, 7, according to another embodiment of the present disclosure. Input device 7 is an example of the input device 1 of FIG. 1, and may include a first layer 711, a second layer 712, a third layer 713, and a fourth layer 714. Input device 7 differs from input device 6 of FIG. 6 by providing a second electrode 720 within a ground layer 713 rather than within the second layer 712. Input device 7 may also include a top cover layer (not shown) similar or identical to the cover layer 111 of FIG. 1.

The first layer 711 may include a first area 711S1 and a second area 711S2. The first area 711S1 may be substantially quadrangular. The first area 711S1 may include a first upper electrode 711A. The first upper electrode 711A may include an array of x electrode lines (e.g., the x electrode lines 112A of FIG. 1). The second area 711S2 may be of a loop type enclosing the first area 711S1. The second area 711S2 may include a second upper electrode 710. For example, the second upper electrode 710 may be disposed in a rim area (e.g., the second area 711S2) of the first layer 711. The second upper electrode 710 may be physically separated from the first upper electrode 711A.

The second layer 712 may be disposed below the first layer 711. The second layer 712 may include a first area 712S1 and a second area 712S2. The first area 712S1 may be substantially quadrangular. Most of the first area 712S1 may overlap the first area 711S1 of the first layer 711. The first area 712S1 may include a first lower electrode 712A. The first lower electrode 712A may include an array of y electrode lines (e.g., the y electrode lines 113A of FIG. 1). The second area 712S2 may be of a loop type enclosing the first area 712S1. The second area 712S2 overlaps the second upper electrode 710 of the first layer 711, where the first lower electrode 712A is omitted.

The third layer 713 may be disposed below the second layer 712 and attached to the second layer 712. The third layer 713 may include a ground plane 713G and a second lower electrode 720. The ground plane 713G may be substantially quadrangular. The ground plane 713G may be centrally disposed in layer 713, inside a peripheral area occupied by the second lower electrode 720. The second lower electrode 720 may be in the shape of a picture frame surrounding the ground plane 713G. The second lower electrode 720 and the ground plane 713G may be physically separated from each other by an isolation region 717. At least part of the second lower electrode 720 may overlap the second upper electrode 710 of the first layer 711. The second lower electrode 720 may not overlap the first upper electrode 711A of the first layer 711 or the second lower electrode 712A of the second layer 712. Alternatively, part of the second lower electrode 720 may overlap the first upper electrode 711A of the first layer 711 or the second lower electrode 712A of the second layer 712.

The fourth layer 714 may be disposed below the third layer 713. The fourth layer 714 may include an electrode part board.

A first electromagnetic field (e.g., the first electromagnetic field 1EF of FIG. 5) used for the first touch input (e.g., the contact touch input) may be generated between the first upper electrode 711A of the first layer 711 and the first lower electrode 712A of the second layer 712 under control of a controller (e.g., a controller in the fourth layer 714).

A second electromagnetic field (e.g., the second electromagnetic field 2EF of FIG. 5) used for the second touch input (e.g., the non-contact touch input) may be generated between the second upper electrode 710 of the first layer 711 and the second lower electrode 720 of the third layer 713 under control of a controller (e.g., a controller in the fourth layer 714).

Figure 8:
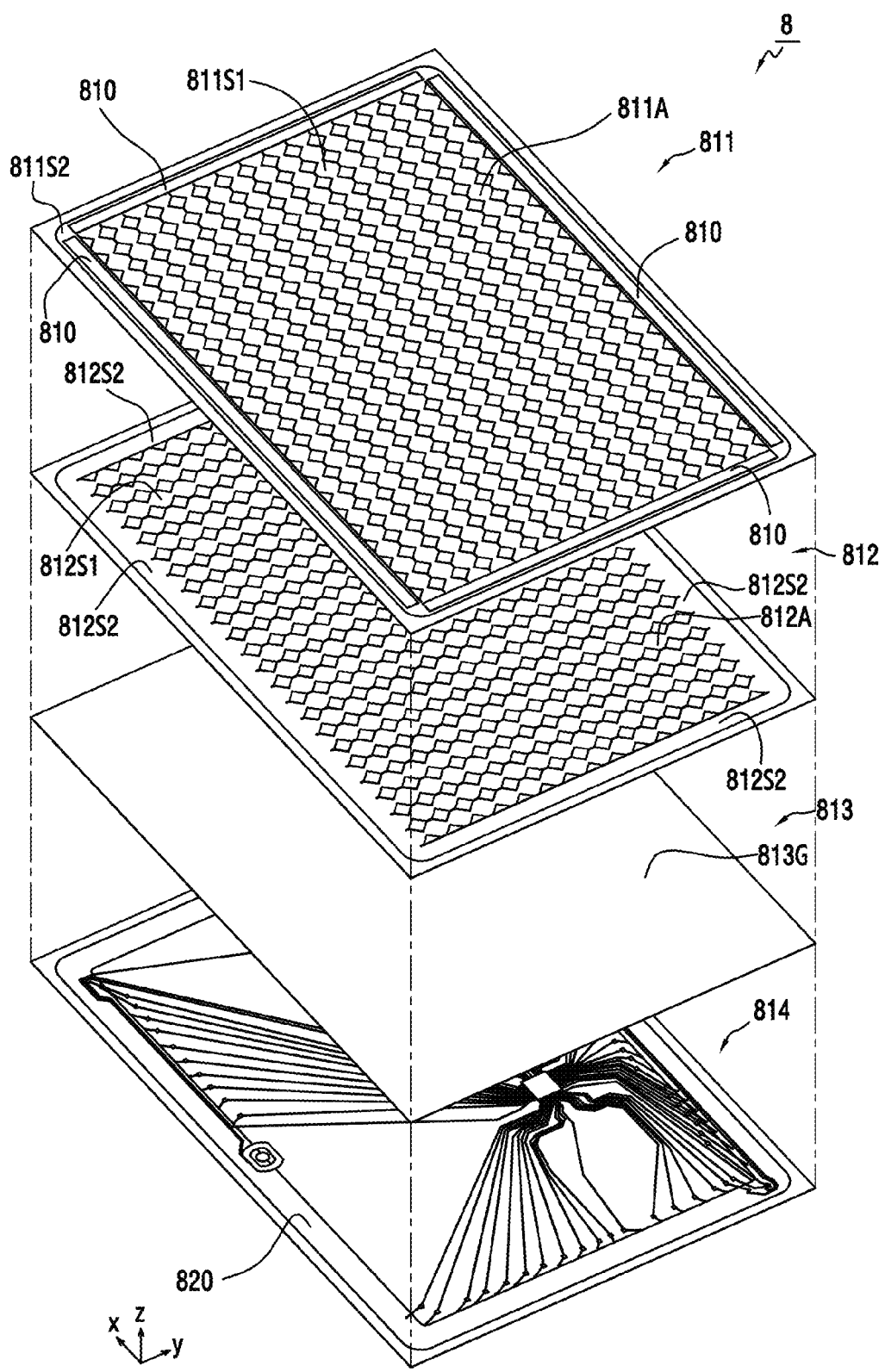
FIG. 8 illustrates an input device according to an embodiment of the present disclosure.

FIG. 8 depicts an input device, 8, according to yet another embodiment of the present disclosure. Input device 8 is an example of the input device 1 of FIG. 1, and may include a first layer 811, a second layer 812, a third layer 813, and a fourth layer 814. Input device 8 differs from input device 6 of FIG. 6 by providing a second lower electrode 820 within a parts layer 814 rather than within the second layer 812. Input device 8 may also include a top cover layer (not shown) similar or identical to the cover layer 111 of FIG. 1.

The first layer 811 may include a first area 811S1 and a second area 811S2. The first area 811S1 may include a first upper electrode 811A. The first upper electrode 811A may include an array of x electrode lines (e.g., the x electrode lines 112A of FIG. 1). The second area 811S2 may be of a loop type enclosing the first area 811S1. The second area 811S2 may include a second upper electrode 810.

The second layer 812 may be disposed below the first layer 811. The second layer 812 may include a first area 812S1 and a second area 812S2. The first area 812S1 may include a first lower electrode 812A. The first lower electrode 812A may include an array of y electrode lines (e.g., the y electrode lines 113A of FIG. 1). The second area 812S2 may be of a loop type enclosing the first area 812S1. The second area 812S2 overlaps the second upper electrode 810 of the first layer 811, where the first lower electrode 812A is omitted.

The third layer 813 may be disposed below the second layer 812. The third layer 813 may include a ground plane.

The fourth layer 814 may be disposed below the third layer 813. The fourth layer 814 may include an electrode part board.

The fourth layer 814 may include a second lower electrode 820. The second lower electrode 820 of a loop type may be disposed to correspond to the second upper electrode 810 of the first layer 811. The second lower electrode 820 may not overlap the first upper electrode 811A of the first layer 811 or the first lower electrode 812A of the second layer 812. Alternatively, part of the second lower electrode 820 may overlap the first upper electrode 811A of the first layer 811 or the first lower electrode 812A of the second layer 812.

A first electromagnetic field (e.g., the first electromagnetic field 1EF of FIG. 5) used for a first touch input (e.g., the contact touch input) may be generated between the first upper electrode 811A of the first layer 811 and the first lower electrode 812A of the second layer 812 under control of a controller (e.g., a controller in the fourth layer 814).

A second electromagnetic field (e.g., the second electromagnetic field 2EF of FIG. 5) used for a second touch input (e.g., the non-contact touch input) may be generated between the second upper electrode 810 of the first layer 811 and the second lower electrode 820 of the fourth layer 814 under control of a controller (e.g., a controller in the fourth layer 814).

Figure 9:
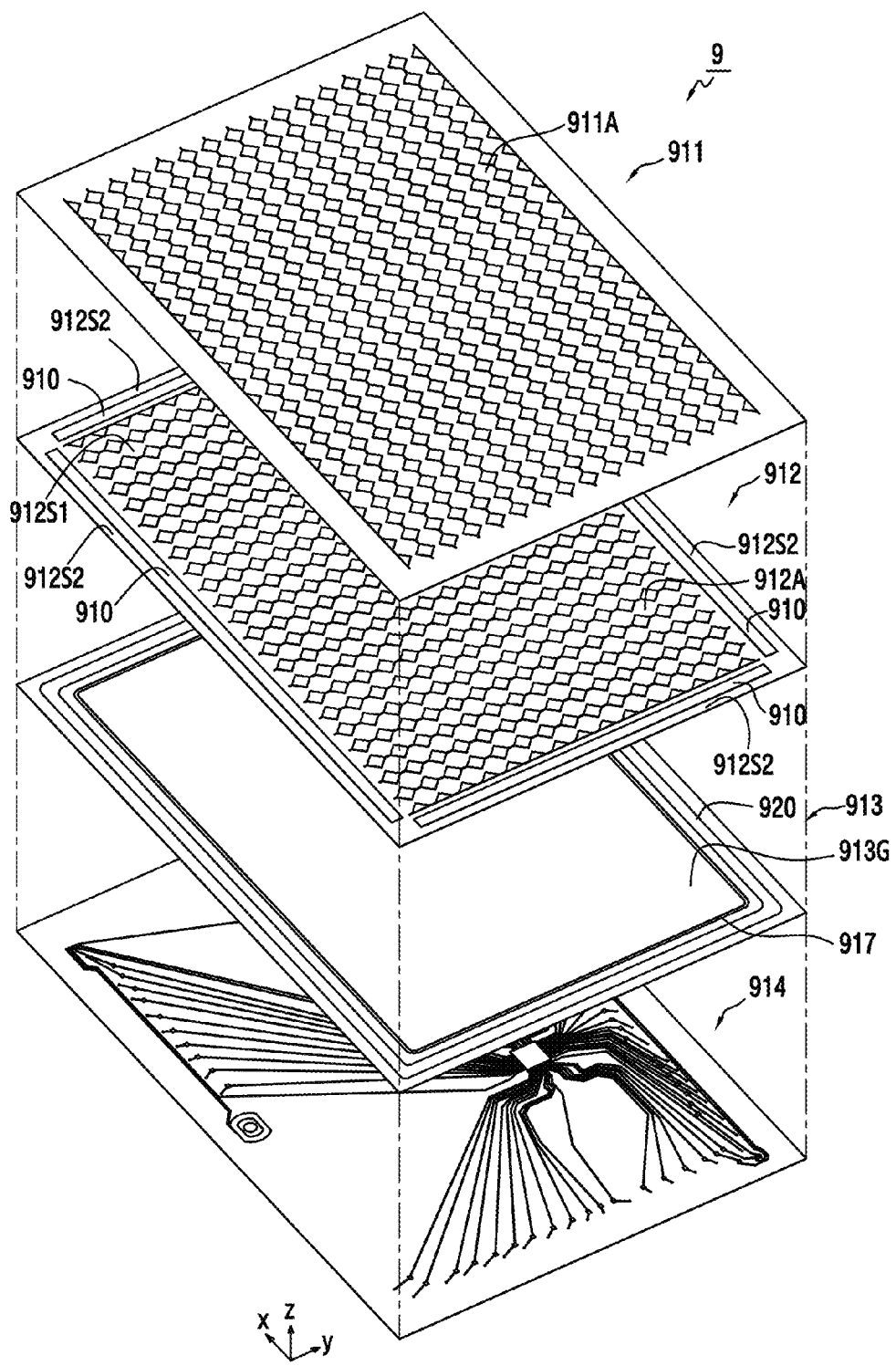
FIG. 9 illustrates an input device according to an embodiment of the present disclosure.

FIG. 9 depicts an input device, 9, according to an additional embodiment of the present disclosure. Input device 9 is an example of the input device 1 of FIG. 1. The input device 9 may include a first layer 911, a second layer 912, a third layer 913, and a fourth layer 914. Input device 9 differs from input device 7 of FIG. 7 by arranging a second upper electrode 910 on a second layer 912 rather than on a first layer 711. Input device 9 may also include a top cover layer (not shown) similar or identical to the cover layer 111 of FIG. 1.

The first layer 911 may include a first upper electrode 911A. The first upper electrode 911A may include an array of x electrode lines (e.g., the x electrode lines 112A of FIG. 1).

The second layer 912 may be disposed below the first layer 611. The second layer 912 may include a first area 912S1 and a second area 912S2. The first area 912S1 may include a first lower electrode 912A. The first lower electrode 912A may include an array of y electrode lines (e.g., the y electrode lines 113A of FIG. 1). The second area 912S2 may be in the shape of a picture frame surrounding the first area 912S1. The second area 912S2 may include a second upper electrode 910. The second upper electrode 910 may be physically separated from the first lower electrode 912A by an isolation region 917. The second upper electrode 910 may not overlap the first upper electrode 911A of the first layer 911. Alternatively, part of the second upper electrode 910 may overlap the first upper electrode 911A of the first layer 911.

The third layer 913 may be disposed below the second layer 912. The third layer 913 may include a ground plane 913G and a second lower electrode 920. The second lower electrode 920 may be of a loop type enclosing the ground plane 913G The second lower electrode 920 and the ground plane 913G may be physically separated from each other. At least part of the second lower electrode 920 may overlap the second upper electrode 910 of the second layer 912. The second lower electrode 920 may not overlap the first upper electrode 911A of the first layer 911 or the second lower electrode 912A of the second layer 912. Alternatively, part of the second lower electrode 920 may overlap the first upper electrode 911A of the first layer 911 or the second lower electrode 912A of the second layer 912.

The fourth layer 914 may be disposed below the third layer 913. The fourth layer 914 may include an electrode part board (e.g., a PCB).

A first electromagnetic field (e.g., the first electromagnetic field 1EF of FIG. 5) used for a first touch input (e.g., the contact touch input) may be generated between the first upper electrode 911A of the first layer 911 and the first lower electrode 912A of the second layer 912 under control of a controller (e.g., a controller in the fourth layer 914).

According to an embodiment, a second electromagnetic field (e.g., the second electromagnetic field 2EF of FIG. 5) used for a second touch input (e.g., the non-contact touch input) may be generated between the second upper electrode 910 of the second layer 912 and the second lower electrode 920 of the third layer 913 under control of a controller (e.g., a controller in the fourth layer 914).

Figure 10:
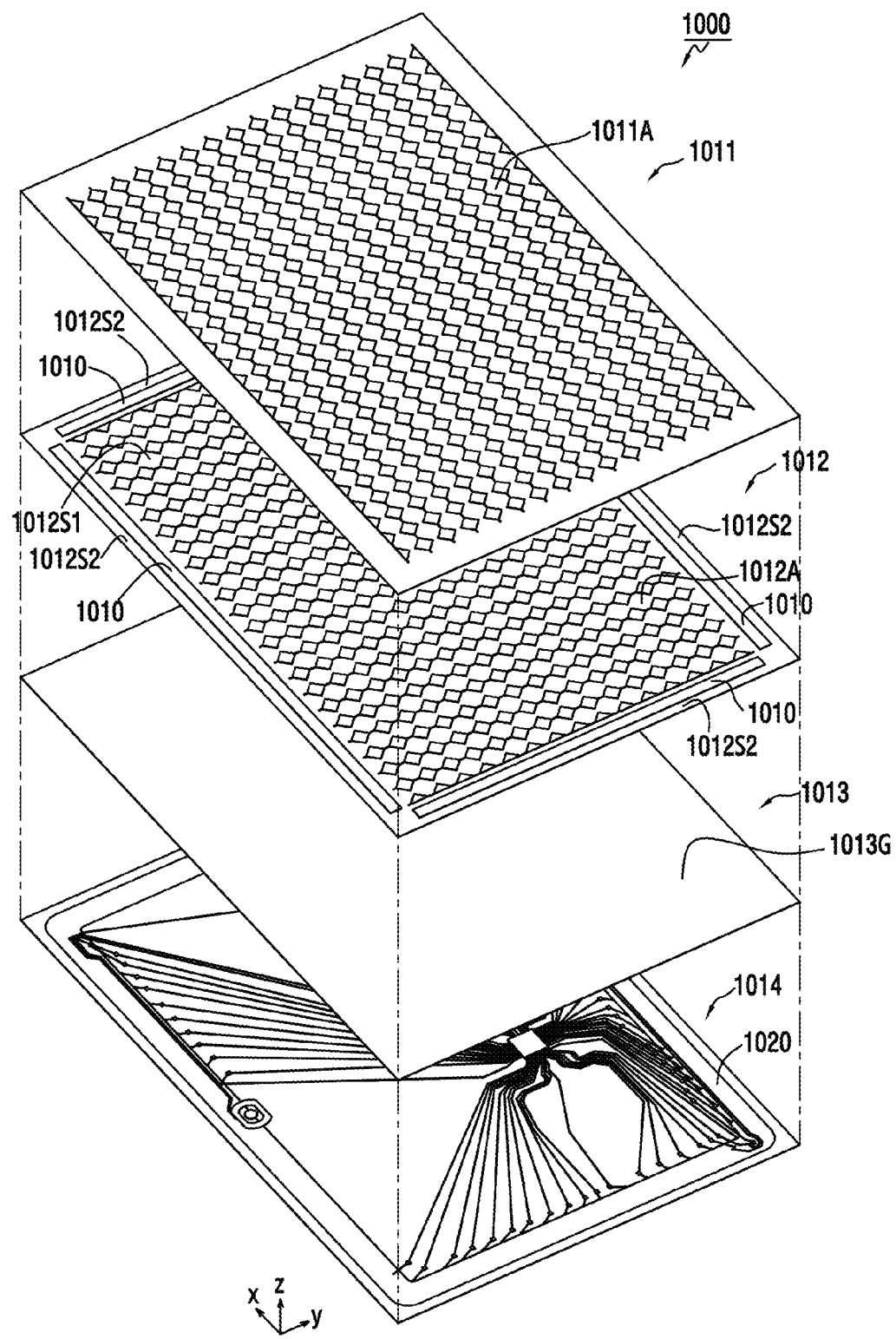
FIG. 10 illustrates an input device according to an embodiment of the present disclosure.

FIG. 10 depicts an input device, 1000, according to a further embodiment of the present disclosure. Input device 1000 is an example of the input device 1 of FIG. 1. The input device 10 may include a first layer 1011, a second layer 1012, a third layer (ground layer) 1013, and a fourth layer (parts layer) 1014. Input device 1000 differs from input device 9 of FIG. 9 by providing a second lower electrode 1020 in the parts layer 1014 rather than in the ground layer 1013. Input device 1000 may also include a top cover layer (not shown) similar or identical to the cover layer 111 of FIG. 1.

The first layer 1011 may include a first upper electrode 1011A. The first upper electrode 1011A may include an array of x electrode lines (e.g., the x electrode lines 112A of FIG. 1).

The second layer 1012 may be disposed below the first layer 1011. The second layer 1012 may include a first area 1012S1 and a second area 1012S2. The first area 1012S1 may include a first lower electrode 1012A. The first lower electrode 1012A may include an array of y electrode lines (e.g., the y electrode lines 113A of FIG. 1). The second area 1012S2 may be of a loop type enclosing the first area 1012S1. The second area 1012S2 may include a second upper electrode 1010. The second upper electrode 1010 may be physically separated from the second lower electrode 1012A. The second upper electrode 1010 may not overlap the first upper electrode 1011A of the first layer 1011. Alternatively, part of the second upper electrode 1010 may overlap the first upper electrode 1011A of the first layer 1011.

The third layer 1013 may be disposed below the second layer 1012. The third layer 1013 may include a ground plane 1013G The fourth layer 1014 may be disposed below the third layer 1013. The fourth layer 1014 may include an electrode part board. The fourth layer 1014 may include a second lower electrode 1020. The second lower electrode 1020 of a loop type may be disposed to correspond to the second upper electrode 1010 of the second layer 1012. At least part of the second lower electrode 1020 may overlap the second upper electrode 1010 of the second layer 1012. The second lower electrode 1020 may not overlap the first upper electrode 1011A of the first layer 1011 or the first lower electrode 1012A of the second layer 1012. Alternatively, part of the second lower electrode 1020 may overlap the first upper electrode 1011A of the first layer 1011 or the first lower electrode 1012A of the second layer 1012.

A first electromagnetic field (e.g., the first electromagnetic field 1EF of FIG. 5) used for a first touch input (e.g., the contact touch input) may be generated between the first upper electrode 1011A of the first layer 1011 and the first lower electrode 1012A of the second layer 1012 under control of a controller (e.g., a controller in the fourth layer 1014).

A second electromagnetic field (e.g., the second electromagnetic field 2EF of FIG. 5) used for a second touch input (e.g., the non-contact touch input) may be generated between the second upper electrode 1010 of the second layer 1012 and the second lower electrode 1020 of the fourth layer 1014 under control of a controller (e.g., a controller in the fourth layer 1014).

Figure 11:
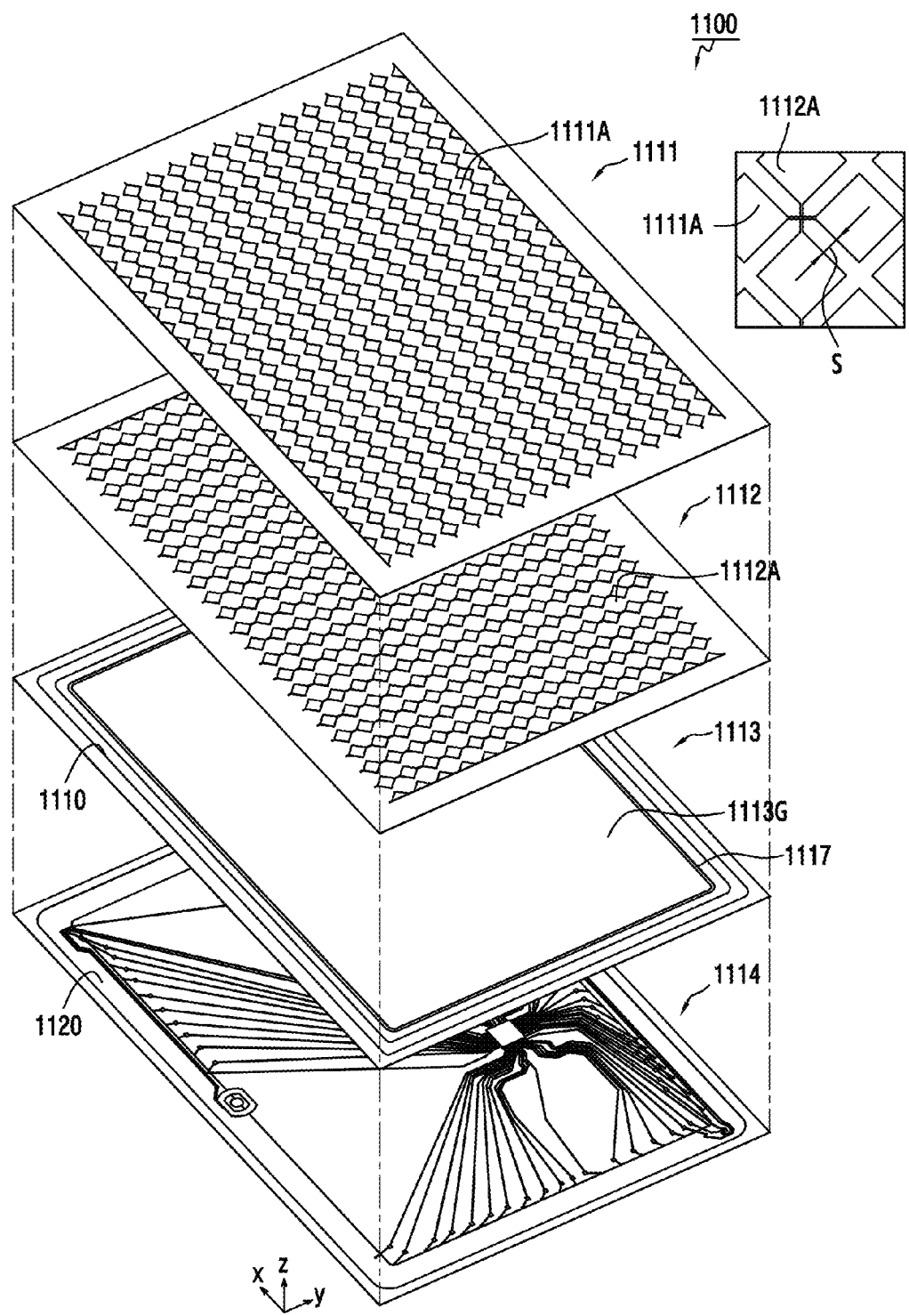
FIG. 11 illustrates an input device according to an embodiment of the present disclosure.

FIG. 11 depicts an input device, 1100, according to still another embodiment of the present disclosure. Input device 1100 is an example of the input device 1 of FIG. 1. The input device 11 may include a first layer 1111, a second layer 1112, a third layer (ground layer) 1113, and a fourth layer 1114. Input device 1100 differs from input device 1000 of FIG. 10 by providing a second upper electrode 1110 in ground layer 1113 rather than in the second layer 1112. Input device 1010 may also include a top cover layer (not shown) similar or identical to the cover layer 111 of FIG. 1.

The first layer 1111 may include a first upper electrode 1111A. The first upper electrode 1111A may include an array of x electrode lines (e.g., the x electrode lines 112A of FIG. 1).

The second layer 1112 may be disposed below the first layer 1111. The first layer 1112 may include a first lower electrode 1112A. The first lower electrode 1112A may include an array of y electrode lines (e.g., the y electrode lines 113A of FIG. 1).

The third layer 1113 may be disposed below the second layer 1112. The third layer 1113 may include a ground plane 1113G and a second upper electrode 1110. The second upper electrode 1110 may be of a loop type enclosing a ground plane 1131G The second upper electrode 1110 may be physically separated from the ground plane 1113G by an isolation region 1117. The second upper electrode 1110 may not overlap the first upper electrode 1111A of the first layer 1111 or the first lower electrode 1112A of the second layer 1112. Alternatively, part of the second upper electrode 1110 may overlap the first upper electrode 1111A of the first layer 1111 or the first lower electrode 1112A of the second layer 1112.

The fourth layer 1114 may be disposed below the third layer 1113. The fourth layer 1114 may include an electrode part board. The fourth layer 1114 may include a second lower electrode 1120. The second lower electrode 1120 of a loop type may be disposed to correspond to the second upper electrode 1110 of the third layer 1113. At least part of the second lower electrode 1120 may overlap the second upper electrode 1110 of the third layer 1113. The second lower electrode 1120 may not overlap the first upper electrode 1111A of the first layer 1111 or the first lower electrode 1112A of the second layer 1112. Alternatively, part of the second lower electrode 1120 may overlap the first upper electrode 1111A of the first layer 1111 or the first lower electrode 1112A of the second layer 1112.

A first electromagnetic field (e.g., the first electromagnetic field 1EF of FIG. 5) used for a first touch input (e.g., the contact touch input) may be generated between the first upper electrode 1111A of the first layer 1111 and the first lower electrode 1112A of the second layer 1112 under control of a controller (e.g., a controller in the fourth layer 1114).

A second electromagnetic field (e.g., the second electromagnetic field 2EF of FIG. 5) used for a second touch input (e.g., the non-contact touch input) may be generated between the second upper electrode 1110 of the second layer 1112 and the second lower electrode 1120 of the fourth layer 1114 under control of a controller (e.g., a controller in the fourth layer 1114).

The second electromagnetic field 2EF may be emitted in between the first upper electrode 1111A and the first lower electrode 1112A. The generation of the second electromagnetic field 2EF may be optimized by adjusting a spacing S between the first upper electrode 1111A and the first lower electrode 1112A.

In any of the embodiments of FIGS. 1 and 6-11 just described, a display may be provided in a layer beneath the second layer such as 612 and above the ground plane layer such as 613, so that any of the input devices 1, 6, 7, 8, 9, 1000 or 1100 may be designed as a touch screen.

Figure 12:
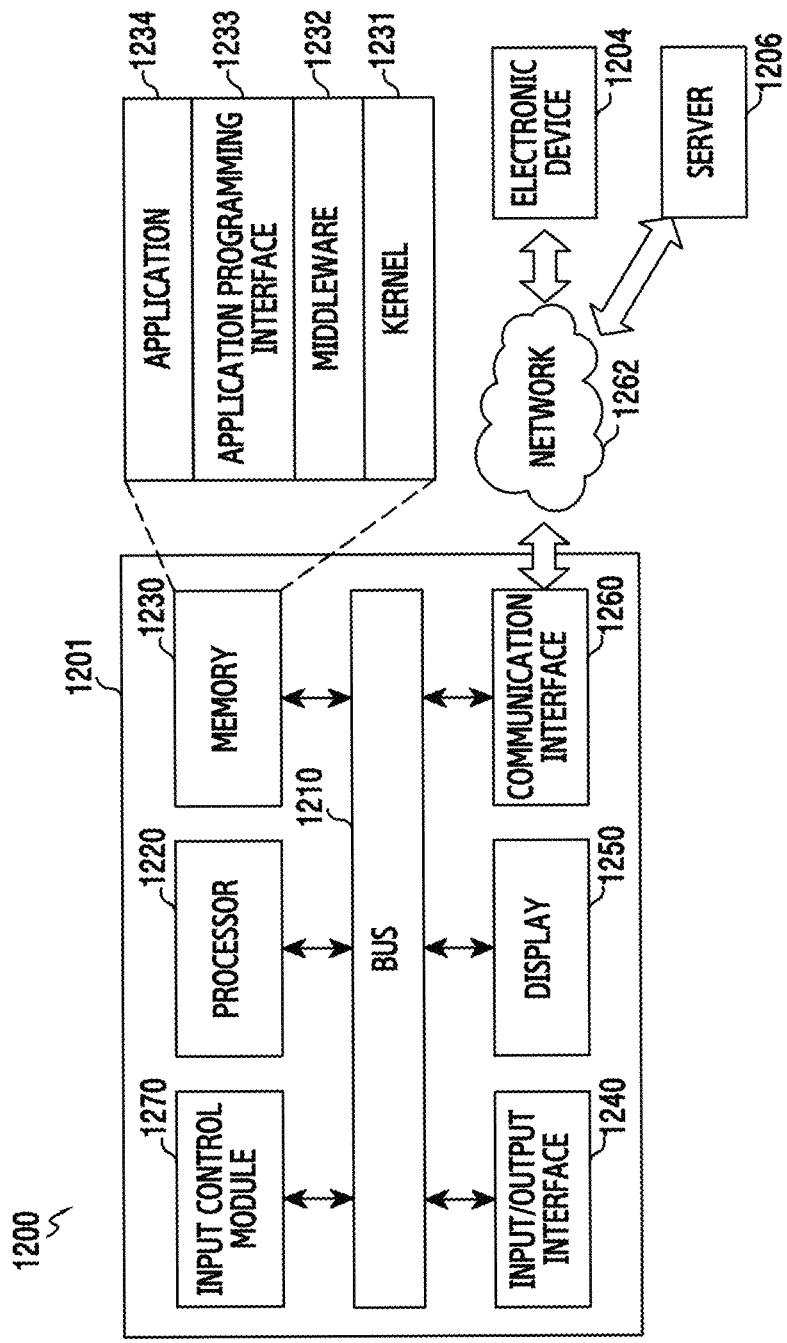
FIG. 12 illustrates a network environment including an electronic device according to an embodiment of the present disclosure.

FIG. 12 depicts a network environment 1200 including an electronic device 1201 according to an embodiment of the present disclosure. Electronic device 1201 may include the input device 1 of FIG. 1. Electronic device 1201 may include a bus 1210, a processor 1220, a memory 1230, an input/output interface 1240, a display 1250, a communication interface 1260, and an input control module 1270.

The bus 1210 may be a circuit for interlinking the above-stated components and transferring communications (e.g., control messages) between the components.

The processor 1220 may receive an instruction from the other components (e.g., the memory 1230, the input/output interface 1240, the display 1250, the communication interface 1260, and the input control module 1270) via the bus 1210, interpret the received instruction, and process an operation or data according to the interpreted instruction.

The memory 1230 may store an instruction or data received from or generated by the processor 1220 or the other components (e.g., the input/output interface 1240, the display 1250, the communication interface 1260, and the input control module 1270). For example, the memory 1230 may include programming modules including a kernel 1231, middleware 1232, an Application Programming Interface (API) 1233, and an application 1234. The programming modules may be implemented using software, firmware, and hardware, or a combination thereof.

The kernel 1231 may control or manage a system resource (e.g., the bus 1210, the processor 1220, or the memory 1230) used to execute the operation or the function of other programming modules, for example, the middleware 1232, the API 1233, and the application 1234. The kernel 1231 may provide an interface allowing the middleware 1232, the API 1233, or the application 1234 to access and control or manage the individual components of the electronic device 1201.

The middleware 1232 may relay data between the API 1233 or the application 1234 and the kernel 1231. The middleware 1232 may perform load balancing for work requests received from the applications 1234 by giving priority for using the system resource (e.g., the bus 1210, the processor 1220, or the memory 1230) of the electronic device 1201 to at least one of the applications 1234.

The API 1233, which is an interface for the application 1234 to control the kernel 1231 or the middleware 1232, may include at least one interface or function (e.g., instruction) for file control, window control, image processing, or text control.

The application 1234 may include a Short Message Service (SMS)/Multimedia Messaging Service (MMS) application, an e-mail application, a calendar application, an alarm application, a health care application (e.g., an application for measuring an amount of exercise, a blood sugar level, and/or the like), or an environmental information application (e.g., an application for providing air pressure, humidity, temperature information, and/or the like). Additionally or alternatively, the application 1234 may be involved in information exchange between the electronic device 1201 and an external electronic device (e.g., an electronic device 1204). The information exchange application may include, for example, a notification relay application for relaying certain information to an external electronic device or a device management application for managing the external electronic device.

For example, the notification relay application may relay the notification information of another application (e.g., an SMS/MMS application, an e-mail application, a health care application, an environmental information application, and/or the like) of the electronic device 1201 to the external electronic device (e.g., the electronic device 1204). Additionally or alternatively, the notification relay application may receive and provide the notification information from the external electronic device (e.g., the electronic device 1204) to the user. The device management application may turn on/off at least part of the function (e.g., the external electronic device (or some other components)) of the external electronic device (e.g., the electronic device 1204) communicating with the electronic device 1201, control brightness (or resolution) of the display, and manage (e.g., install, delete, or update) the service (e.g., a call service or a messaging service) provided by an application of the external electronic device or by the external electronic device itself.

The application 1234 may include an application designated based on an attribute (e.g., a type of the electronic device) of the external electronic device (e.g., the electronic device 1204). For example, when the external electronic device is an MP3 player, the application 1234 may include a music playing application. Similarly, when the external electronic device is a mobile medical device, the application 1234 may include a health care application. The application 1234 may include at least one of the application designated in the electronic device 1201 and the application received from the external electronic device (e.g., a server 1206 or the electronic device 1204).

The input/output interface 1240 may forward an instruction or data input from the user through an input/output device (e.g., a sensor, a keyboard, a touch screen, or the input device of any one of those in FIG. 1 through FIG. 11) to, for example, the processor 1220, the memory 1230, or the communication interface 1260 via the bus 1210. For example, the input/output interface 1240 may forward data (or a signal) of the first touch (e.g., the contact touch) input through one of the input devices of FIG. 1 through FIG. 11, to the processor 1220. Alternatively, the input/output interface 1240 may forward data of the second touch (e.g., the non-contact touch) input through one of the input devices of FIG. 1 through FIG. 11, to the processor 1220. Alternatively, the input/output interface 1240 may forward data of the user's touch input through the touch screen, to the processor 1220. For example, the input/output interface 1240 may output an instruction or data received from the processor 1220, the memory 1230, or the communication interface 1260 via the bus 1210, through an input/output device (e.g., a speaker or a display). For example, the input/output interface 1240 may output voice data processed by the processor 1220 to the user through the speaker.

The display 1250 may display various information (e.g., multimedia data or text data) to the user.

The communication interface 1260 may establish the communication between the electronic device 1201 and the external device (e.g., the electronic device 1204, the server 1206). For example, the communication interface 1260 may communicate with the external device over a network 1262 using wireless communication or wired communication. The wireless communication may include at least one of, for example, Wireless Fidelity (WiFi), Bluetooth (BT), Near Field Communication (NFC), GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), WiBro, or Global System for Mobile Communications (GSM)). The wired communication may include at least one of, for example, a Universal Serial Bus (USB), a High Definition Multimedia Interface (HDMI), a Recommended Standard (RS) 232, a Plain Old Telephone Service (POTS), and/or the like.

The network 1262 may be the communication network. The communication network may include at least one of a computer network, the Internet, the Internet of things, and a telephone network. The protocol (e.g., transport layer protocol, data link protocol, or physical layer protocol) for the communication between the electronic device 1201 and the external device may be supported by at least one of the application 1234, the API 1233, the middleware 1232, the kernel 1231, and the communication interface 1260.

The input control module 1270, in a first mode, may enable the first input device 1T of FIG. 1 and disable the second input device 2T of FIG. 1. The input control module 1270 may forward the first touch input (e.g., contact touch input) signal acquired through the first input device 1T enabled in the first mode, to the processor 1220 via the bus 1210. The processor 1220 may substitute for the input control module 1270.

The input control module 1270, in a second mode, may disable the first input device 1T of FIG. 1 and enable the second input device 2T of FIG. 1. The input control module 1270 may forward the second touch input (e.g., non-contact touch input) signal acquired through the second input device 1T enabled in the second mode, to the processor 1220 via the bus 1210.

The input control module 1270, in a third mode, may disable both of the first input device 1T and the second input device 2T.

Figure 13:
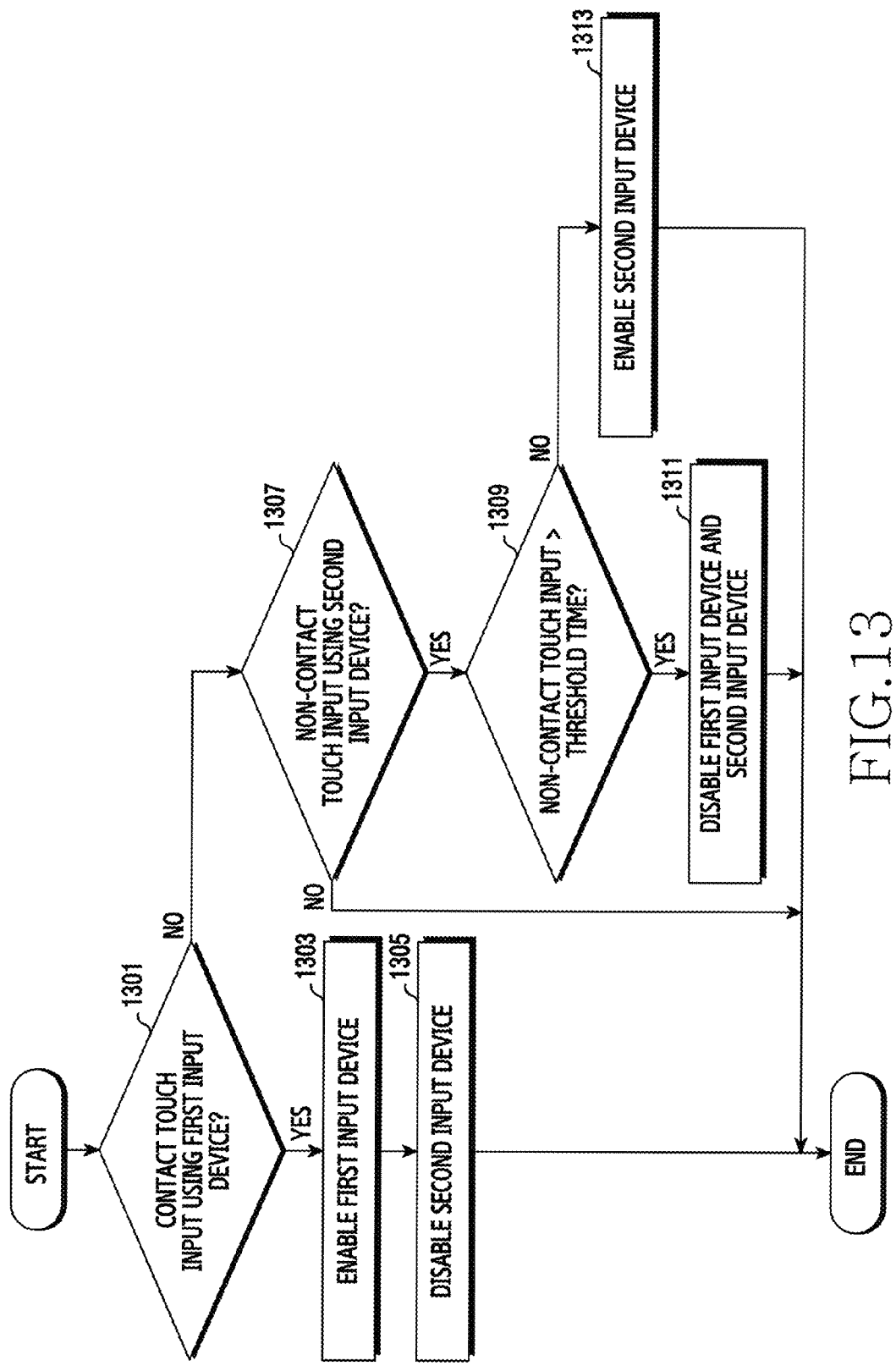
FIG. 13 illustrates a method for controlling an input device according to an embodiment of the present disclosure.

FIG. 13 is a flowchart of a method for controlling an input device according to an embodiment of the present disclosure. The method may be operative in the input device 1201 of FIG. 12. As shown in FIG. 13, in operation 1301, the input control module 1270 of FIG. 12 may determine whether the contact touch is input using the first input device 1T of FIG. 1 (which is initially in an enabled state).

When the contact touch is input using the first input device 1T, the input control module 1270 may continue to enable the first input device 1T in operation 1303. The contact touch input using the first input device 1T may be provided to a host device (e.g., the processor 1220). In operation 1305, the input control module 1270 may disable the second input device. This mode may be referred to as the first input mode.

At 1301, when no contact touch is input using the first input device 1T, the input control module 1270 may then determine whether a non-contact touch is input using the second input device 2T of FIG. 1 in operation 1307.

When the non-contact touch is input using the second input device 2T, the input control module 1270 may determine whether a non-contact touch input time exceeds a threshold time in operation 1309.

When the non-contact touch input time exceeds the threshold time, the input control module 1270 may disable both of the first input device 1T and the second input device 2T in operation 1311. This mode may be referred to as a disabled input mode of the input device 1201. With regard to an overall electronic device such as a laptop computer that includes a keyboard, the disabled input mode may also be called a second input mode of the electronic device, which is a mode allowing keyboard input but not inputs to the input device 1201.

When the non-contact touch input time does not exceed the threshold time, the input control module 1270 may enable the second input device 2T in operation 1313. The non-contact touch input using the second input device 2T may be provided to the host device (e.g., the processor 1220). This mode may be referred to as a third input mode. Accordingly, with the method of FIG. 13, when a user makes an intentional air based, i.e., non-contact, gesture at a close distance to the region of the input device 1201 above the second electrodes of the second input device 2T, the gesture may be considered to take less than the threshold time to complete. Further, it may be assumed that the user moves his finger out of the range of the second electrodes' region when the gesture is complete. Thus the gesture may be recognized as a valid gesture for an input command, since the second input device is enabled at 1313. On the other hand, if the user's hand hovers over the second electrodes' region for longer than the threshold time, it may considered that such hovering is not intended as a user input, whereby the first input device and second input device may be disabled at 1311.

Figure 14:
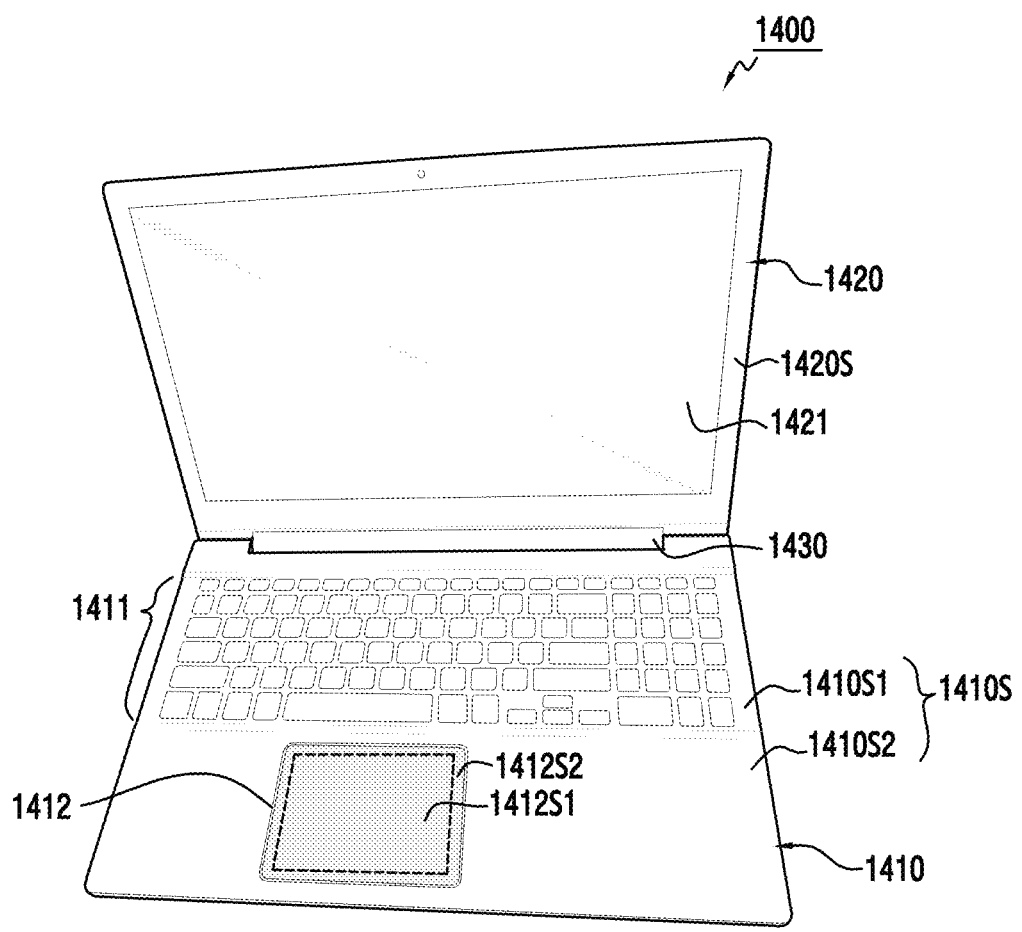
FIG. 14 illustrates an electronic device according to an embodiment of the present disclosure.

FIG. 14 depicts an electronic device 1400 according to an embodiment of the present disclosure. Electronic device 1400 (e.g., a laptop computer) may include a first plate 1410 and a second plate 1420. The first plate 1410 and the second plate 1420 may be coupled using a hinge. The second plate 1420 may be rotated and cover one side 1410S of the first plate 1410 when the device 1400 is folded closed. The electronic device 1400 may include the electrode device 1201 of FIG. 12.

The one side 1410S of the first plate 1410 may include a first side 1410S1 and a second side 1410S2. The first side 1410S1 may be interposed between the second side 1410S2 and a hinge coupler 1430. The first side 1410S1 may include a keyboard 1411. The second side 1410S2 may include an electromagnetic field input device 1412.

The electromagnetic field input device 1412 (e.g., a touch pad) may include a first input area 1412S1 and a second input area 1412S2. The first input area 1412S1 may receive a contact touch input. The second input area 1412S2 may receive a non-contact touch input. The second input area 1412S2 may be in the form of a ring enclosing the first input area 1412S1.

The electromagnetic field input device 1412 may employ the input device in one of FIGS. 1 through 11. For example, the first input area 1412S1 may correspond to the first electrodes of the first input device 1T of FIG. 1. The second input area 1412S2 may correspond to the second electrodes of the second input device 2T of FIG. 1.

The electromagnetic field input device 1412 may be controlled as described in FIG. 13. For example, when the user touches the first input area 1412S1 with his/her finger, the first input area 1412S1 may be enabled and the second input area 1412S2 may be disabled.

The user may cause an unintended non-contact touch input using the second input area 1412S2. For example, when the user uses the keyboard, it is highly likely that part of his/her hand continuously inputs the non-contact touch using the second input area 1412S2. In this case, it is advantageous that both of the first input area 1412S1 and the second input area 1412S2 are disabled to receive only the keyboard input. Here, whether to use the first input area 1412S1 and the second input area 1412S2 may be determined by determining whether the keyboard 1411 is used in consideration of a non-contact touch input time using the second input area 1412S2, as described for the method of FIG. 13.

When no contact touch is input to the first input area 1412S1 and a non-contact touch is input to the second input area 1412S2, the second input area 1412S2 may be enabled.

Figure 15:
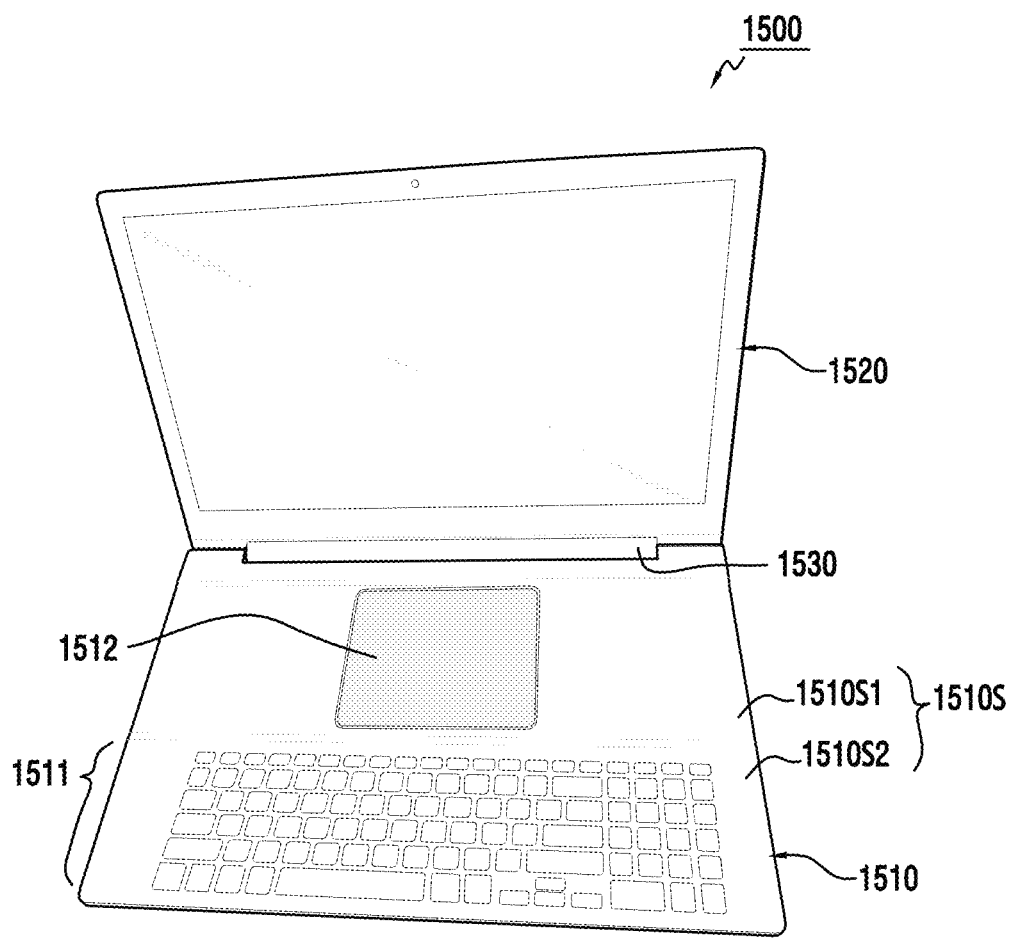
FIG. 15 illustrates an electronic device according to another embodiment of the present disclosure.

FIG. 15 depicts an electronic device 1500 according to another embodiment of the present disclosure. Electronic device 1500 may be a laptop and include a first plate 1510 and a second plate 1520. The second plate 1520 may be coupled to the first plate 1510 using a hinge, and may be rotated to cover one side 1510S of the first plate 1510 when the laptop is folded closed.

The one side 1510S of the first plate 1510 may include a first side 1510S1 and a second side 1510S2. The first side 1510S1 may be interposed between the second side 1510S2 and a hinge coupler 1530. The first side 1510S1 may include an electromagnetic field input device 1512. The second side 1510S2 may include a keyboard 1511.

The electromagnetic field input device 1512 may employ the input device in any one of FIGS. 1 through 11.

An arrangement of the keyboard 1511 disposed on a front part of the first plate 1510 nearest the user, and the electromagnetic field input device 1512 disposed on a rear part of the first plate further from the user, may prevent the user's hand which is using the keyboard 1511 from approaching or touching the electromagnetic field input device 1512, and thus reduce an unintended input through the electromagnetic field input device 1512.

Figure 16:
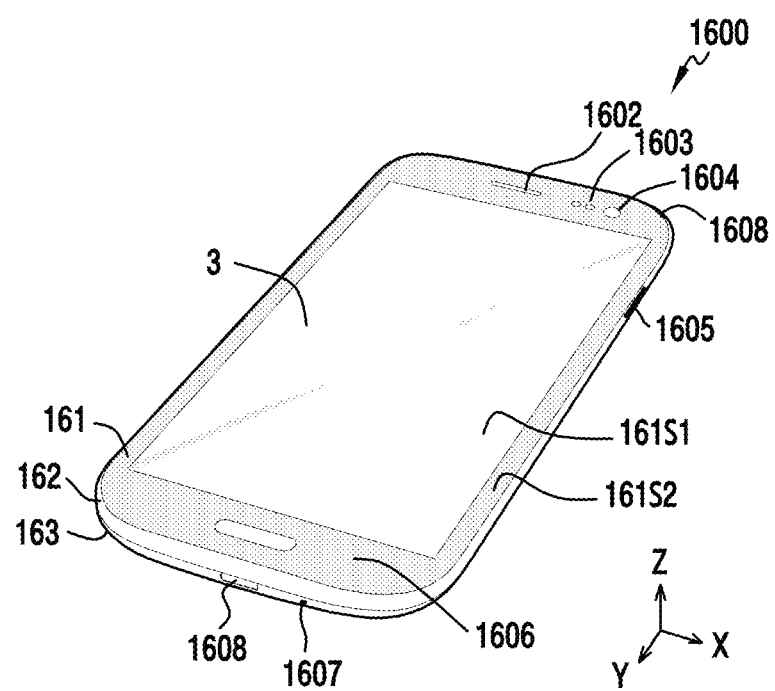
FIG. 16 illustrates an electronic device according to an embodiment of the present disclosure.

FIG. 16 depicts an electronic device 1600 according to an embodiment of the present disclosure. Electronic device 1600 may include the electronic device 1201 of FIG. 12, and may include a top surface 161, a side surface 162, and a bottom surface 163. The top surface 161 and the bottom surface 163 may be exterior surfaces of front and rear housing parts that face each other, and the side surface 162 (e.g., the rim) may interconnect the top surface 161 and the bottom surface 163. The top surface 161, the side surface 162, or the bottom surface 163 may include a plane surface or a curved surface. For example, the electronic device 1600, although not depicted, may include the top surface 161 or the bottom surface 163 in a convex or concave shape. Alternatively, the electronic device 1600 may include the top surface 161, the side surface 162, or the bottom surface 163 being flexible or wearable to allow deformation.

The electronic device 1600 may include a display set 3, a speaker 1602, a sensor 1603, a camera 1604, a button 1605, a touch key button 1606, a microphone 1607, an antenna 1608, and a socket 1609.

The display set 3 may be disposed on the top surface 161 of the electronic device 1600. The display set 3 may include a Liquid Crystal Display (LCD) or an Active Matrix Organic Light Emitting Diode (AMOLED). The display set 3 may include a touch sensing device (e.g., a touch panel or a digitizer panel) for recognizing the touch input.

The speaker 1602 may be disposed on the top surface 161 of the electronic device 1600. Alternatively, although not depicted, the speaker 1602 may be disposed in the side surface 162 or the bottom surface 163 of the electronic device 1600.

The sensor 1603 may be disposed on, but not limited to, the top surface 161 of the electronic device 1600. The sensor 1603 may measure a physical quantity or detect an operation status of the electronic device 1600, and convert the measured or detected information to an electric signal. The sensor 1603 may include a gesture sensor, a proximity sensor, a grip sensor, a gyro sensor, an acceleration sensor, a geomagnetic sensor, an atmospheric pressure sensor, a temperature/humidity sensor, a Hall sensor, a red, green, and blue (RGB) sensor, a light sensor, a biometric sensor (e.g., a heart rate sensor), or an Ultra Violet (UV) sensor.

The camera 1604 may be disposed in, but not limited to, the top surface 161 of the electronic device 1600.

The button 1605 may be disposed in, but not limited to, the top surface 161 or the side surface 162 of the electronic device 1600. The button 1605 may adopt a press type.

The touch key button 1606 may be disposed in the top surface 161 of the electronic device 1600.

The microphone 1607 may be disposed in, but not limited to, the side surface 162 of the electronic device 1600. Alternatively, the microphone 1607 may be disposed in, although not depicted, the top surface 161 or the bottom surface 163 of the electronic device 1600.

The antenna 1608 (e.g., a Digital Multimedia Broadcasting (DMB) antenna or a cellular antenna) may be extended outwards through a through hole (not shown) in the side surface 162 of the electronic device 1600. Alternatively, the antenna 1608 may be embedded in, although not depicted, a housing, a case frame, or a circuit board (e.g., a main board) of the electronic device 1600.

The socket 1608 (e.g., a USB socket, a charging jack, a communication jack, or an ear jack) may be disposed in, but not limited to, the side surface 162 of the electronic device 1600.

Although not depicted, the electronic device 1600 may further include a stylus. The stylus may be detached outwards through a through hole (not shown) in the side surface 162 of the electronic device 1600.

The top surface 161 of the electronic device 1600 may include a first input area 161S1 and a second input area 161S2. The second input area 161S2 may be in the shape of a ring surrounding the first input area 161S1. Alternatively, the second input area 161 S2 may be rectangular and disposed adjacent to just one side of the first input area 161S1, as in the configuration of FIG. 4. The first input area 161S1 and a second input area 161S2 may employ various shapes and arrangements.

The first input area 161S1 may receive the contact touch input. For example, the first input area 161S1 may coincide with the first electrodes of the first input device 1T of FIG. 1, so that the first electromagnetic field 1EF is generated directly above the first input area 161S1. The first input area 161S1 may match a screen of the display set 3.

The second input area 161S2 may receive the non-contact touch input. The second input area 161S2 may coincide with the second electrodes of the second input device 2T of FIG. 1, so that the second electromagnetic field 2EF is generated directly above the second input area 161S2. The second input area 161S2 may not include at least part of the screen of the display set 3. Alternatively, the second input area 161S2 may include at least part of the screen of the display set 3.

Figure 17:
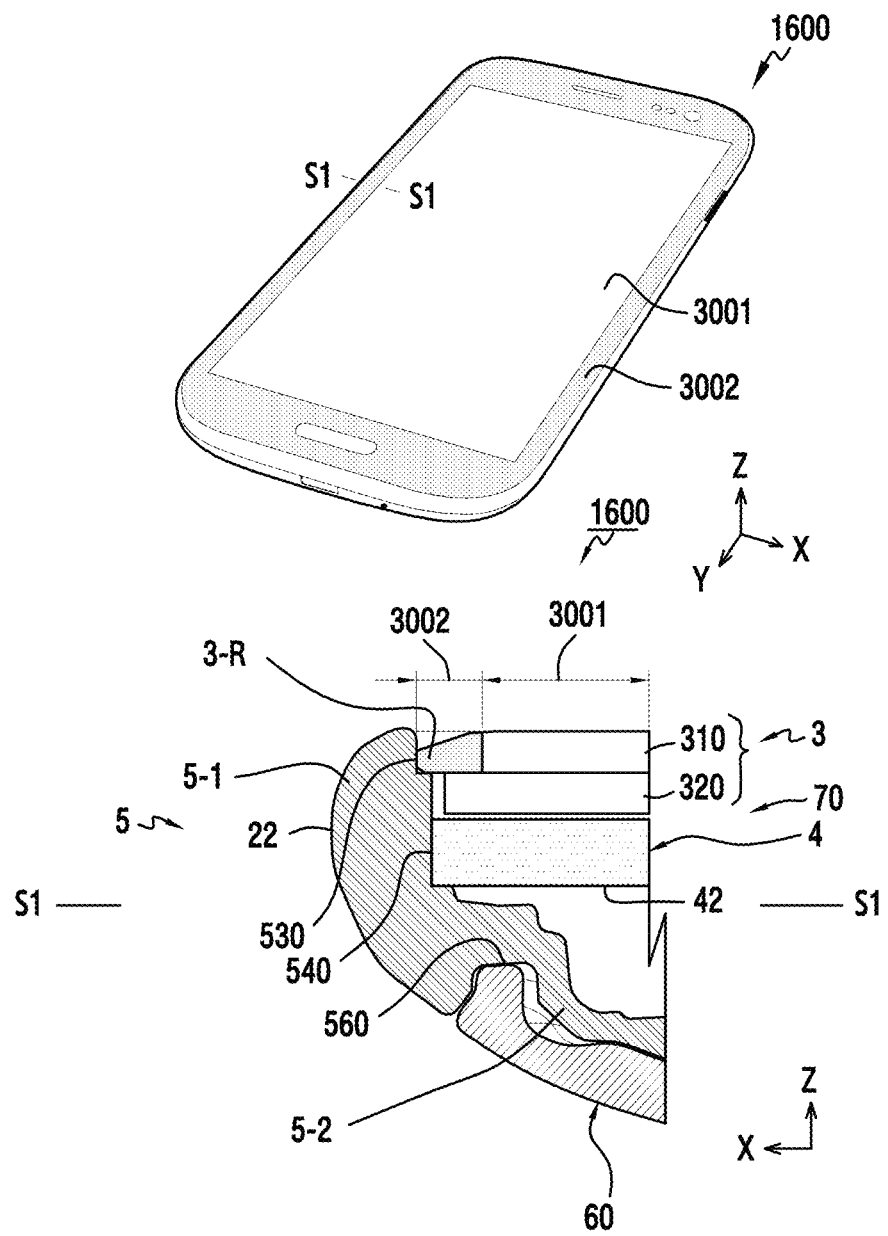
FIG. 17 depicts a perspective view and a cross-sectional view of an electronic device according to an embodiment of the present disclosure.

FIG. 17 depicts a perspective view and a cross-sectional view of an electronic device according to an embodiment of the present disclosure. As shown in FIG. 17, the electronic device 1600 may include the display set 3, a PBA 4, a device case 5, a cover 60, and an electromagnetic field input device 70.

The display set 3 may include a window 310 and a display panel 320.

The window 310 may include a transparent plate, a bonding layer, a plastic film, a pattern layer, a metal layer, and a shielding layer.

The transparent plate may be disposed on the display panel 320 to protect the display panel 320. The transparent plate may be formed of a plastic material such as impact-resistant acryl, or a glass material (e.g., a tempered glass).

The bonding layer may be interposed between the transparent plate and the plastic film to adhere the plastic film to the transparent plate. The bonding layer may be disposed in a rim area 3002 (e.g., a rectangular loop area) of the window 310. The bonding layer may not overlap a view area 3001. Here, the view area 3001 indicates an area displaying an image of the display panel 320 and may be referred to as a display area or a screen. The rim area 3002 indicates an area not displaying an image of the display panel 320 and may be referred to as a non-display area.

The bonding layer may be transparent. Alternatively, the bonding layer may be dyed using a dye, a pigment, a coloring, a fluorescent material, or a phosphorescent material which produces a certain color. The bonding layer may include a Pressure Sensitive Adhesive (PSA).

The plastic film may be attached to the non-display area 3002 of the window 310 using the bonding layer. The plastic film may be of a band shape corresponding to the non-display area 3002 of the window 310. The plastic film may not overlap the view area 3001. The plastic film may be transparent. The plastic film may be formed of a material having high thermal stability and high mechanical strength. The plastic film may employ a polyethylene terephthalate (PET) film, a polycarbonate (PC) film, a polyethylene (PE) film, or a polypropylene (PP) film.

The pattern layer may include various patterns (e.g., a plane pattern or a three-dimensional pattern) attached or printed at the bottom of the plastic film. The pattern layer may not overlap the view area 3001. The pattern layer may be formed using UV molding. The pattern layer formed using the UV molding may include a pattern corresponding to a pattern formed in a mold. The mold pattern may be fabricated using a mechanic processing, a laser processing, or a photolithography. The pattern layer may be reflected at an external light and represent a metallic texture. The pattern of the pattern layer may include a hairline. Since the pattern layer is disposed below the transparent layer of a certain thickness, the pattern of the pattern layer may be viewed in three dimensions through the transparent plate.

The metal layer may be attached below the pattern layer. The metal layer may not overlap the view area 3001. The metal layer may be formed by depositing (e.g., Physical Vapor Deposition (PVD) or Chemical Vapor Deposition (CVP)) or coating a metal at the bottom of the pattern layer. The metal layer may be reflected by an external light and represent a metallic texture. Since the metal layer is disposed below the transparent layer of a certain thickness, the pattern of the metal layer may be viewed in three dimensions through the transparent plate.

An area of the transparent plate not corresponding to the view area 3001 may be represented as a metal material due to the pattern layer and the metal layer.

The shielding layer may be formed below the metal layer. The shielding layer may not overlap the view area 3001. The shielding layer may block the external light to the rim area of the transparent plate. The shielding layer may block the light from the display panel 320 from coming to the rim area of the transparent plate. The shielding layer may include a black component for absorbing the light without reflecting the light. The shielding layer may be a layer printed in black. The shielding layer may be an adhesive including a black component. The shielding layer may include a black film and an adhesive material.

The display panel 320 may be disposed below the window 310. For example, the display panel 320 may be attached to the transparent bonding layer below the shielding layer. The display panel 320 may employ an LCD or an AMLED. The display panel 320 may be flexible, transparent, or wearable. The window 310 also may be flexible, transparent, or wearable.

The display set 3 may include a mounting plate (e.g., a nonmetal or metal bracket), which is not shown, below the display panel 320.

A Printed Board Assembly (PBA) 4 may be disposed below the display set 3. At least part of the PBA 4 may contact the display set 3. Alternatively, at least part of the PBA 4 may be separated from the display set 3. Alternatively, the PBA 4 may be disposed in parallel with the display set 3. The PBA 4 may include a board including a basic circuit and a plurality of electronic parts. The PBA 4 may include a circuit board, a main board, or a mother board. The PBA 4 may configure and retain an execution environment of the electronic device 1600, and allow stable operation of the electronic device 1600. The PBA 4 may facilitate data input/output exchange of the devices of the electronic device 1600.

The device case 5 may include a first case body 5-1 and a second case body 5-2. The first case body 5-1 may include a side 152 of the electronic device 1600. The second case body 5-2 may be extended from the first case body 5-1 and interposed between the PBA 4 and the cover 60.

The device case 5 may include a first mounting portion 530, a second mounting portion 540, and a third mounting portion 560.

The display set 3 is mounted in the first mounting portion 530. For example, the first mounting portion 530 may include a loop-type rim at the top of the first case body 5-1. A rim 3-R (e.g., the rim of the window 31) of the display set 3 may be attached to the first mounting portion 530. The display set 3 may be attached to the first mounting portion 530, and a space for mounting the electronic parts (e.g., the PBA 4) may be created between the display set 3 and the device case 5.

The PBA 4 may be mounted in the second mounting portion 540. The second mounting portion 540 may be disposed below the first mounting portion 530. The second mounting portion 540 may include various shapes (e.g., a groove) including a plane and/or a curve for mounting the PBA 4. For example, the second mounting portion 540 may include a support shape for supporting a bottom 42 of the PBA 4. Alternatively, the second mounting portion 540 may include a groove, which is not shown, for accommodating the electronic part (e.g., the socket 520 of FIG. 2) mounted at the bottom 42 of the PBA 4. Alternatively, the second mounting portion 540 may include a boss for bolting the electronic part (e.g., the PBA 4). The second mounting portion 540 may be disposed in at least one of the first case body 5-1 and the second case body 5-2.

The cover 60 is mounted in the third mounting portion 560, and the third mounting portion 560 may be formed in the second case body 5-2. The third mounting portion 560 may include a shape for easily detaching the cover 60. For example, the cover 60 may include a plurality of hooks arranged on the rim, and the third mounting portion 560 may include a plurality of hook grooves for coupling with the hooks of the cover 60. Here, the coupling between the hooks of the cover 60 and the hook grooves of the third mounting portion 560 may be referred to as snap-fit.

The cover 60 may include a bottom 163 (FIG. 16) of the electronic device 1600. The cover 60 may be separated from the device case 5 when a detachable electronic part (e.g., a memory card or a battery pack), which is not shown, is replaced. The cover 60 may be referred to as a battery cover. An exposed side (the bottom surface 163 of the electronic device 1600) of the cover 60 may include a curved surface. The exposed side of the cover 60 may be evenly connected to the exposed side (the side surface 162 of the electronic device 1600) of the device case 5 to thus decorate an exterior of the electronic device 1600.

The device case 5 and the cover 60 may be referred to as a housing. The housing may indicate a box-type portion enclosing the electronic device 1600.

The electromagnetic field input device 70 may include the input device as shown in one of FIG. 1 through FIG. 11. For example, at least part of the electromagnetic field input device 70 may be disposed in the display set 3. A parts layer such as 614 of the input device 70 may be disposed in the PBA 4. The electromagnetic field input device 70 may emit the first electromagnetic field 1EF of FIG. 5 used for the contact touch input, through at least part of the screen 3001. Alternatively, the electromagnetic field input device 70 may emit the second electromagnetic field 2EF used for the contact touch input, through part of the non-display area 3002. The electromagnetic field input device 70 may emit the second electromagnetic field 2EF used for the non-contact touch input, through at least part of the screen 3002. Alternatively, the electromagnetic field input device 70 may emit the second electromagnetic field 2EF used for the non-contact touch input, through at least part of the non-display area 3002.

At least part of the electromagnetic field input device 70 may be disposed in a touch panel (not shown) between the window 3 and the display panel 320. For example, the first upper electrode (e.g., the array 112A of the x electrode lines in FIG. 1), the first lower electrode (e.g., the array 113A of the y electrode lines), the second upper electrode 110 of FIG. 1, or the second lower electrode 120 of FIG. 1 may be formed in Indium Tin Oxide (ITO) of the touch panel.

At least part of the electromagnetic field input device 70 may be disposed in a digitizer or a pen sensor (not shown) below the display panel 320.

At least part of the electromagnetic field input device 70 may be disposed in the PBA 4.

At least part of the electromagnetic field input device 70 may be disposed in the housing (e.g., the device case 5).

Figure 18:
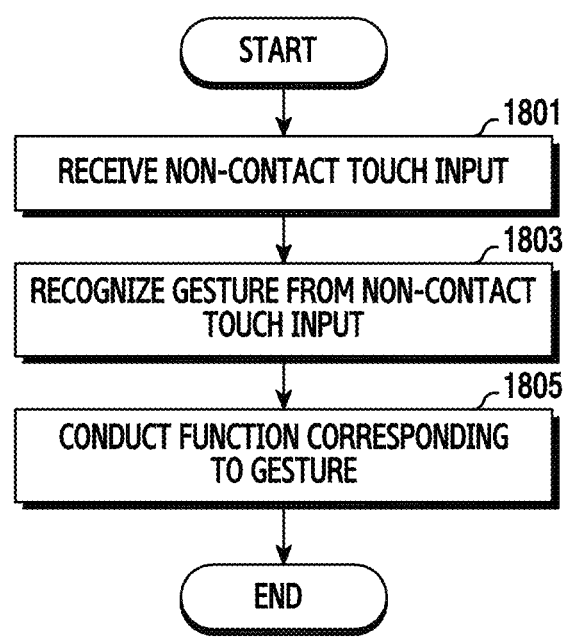
FIG. 18 illustrates operations of an electronic device according to an embodiment of the present disclosure.

FIG. 18 is a flowchart of operations of an electronic device according to an embodiment of the present disclosure. In operation 1801, the processor 1220 of FIG. 12 may receive a non-contact touch input from an input device (e.g., the input device shown in one of FIG. 1 through FIG. 11). The non-contact touch input may include the spatial coordinates.

In operation 1803, the processor 1220 may recognize a gesture (or a motion) based on the non-contact touch input.

In operation 1805, the processor 1220 may conduct a function (e.g., display control or voice control) corresponding to the gesture.

Figure 19:
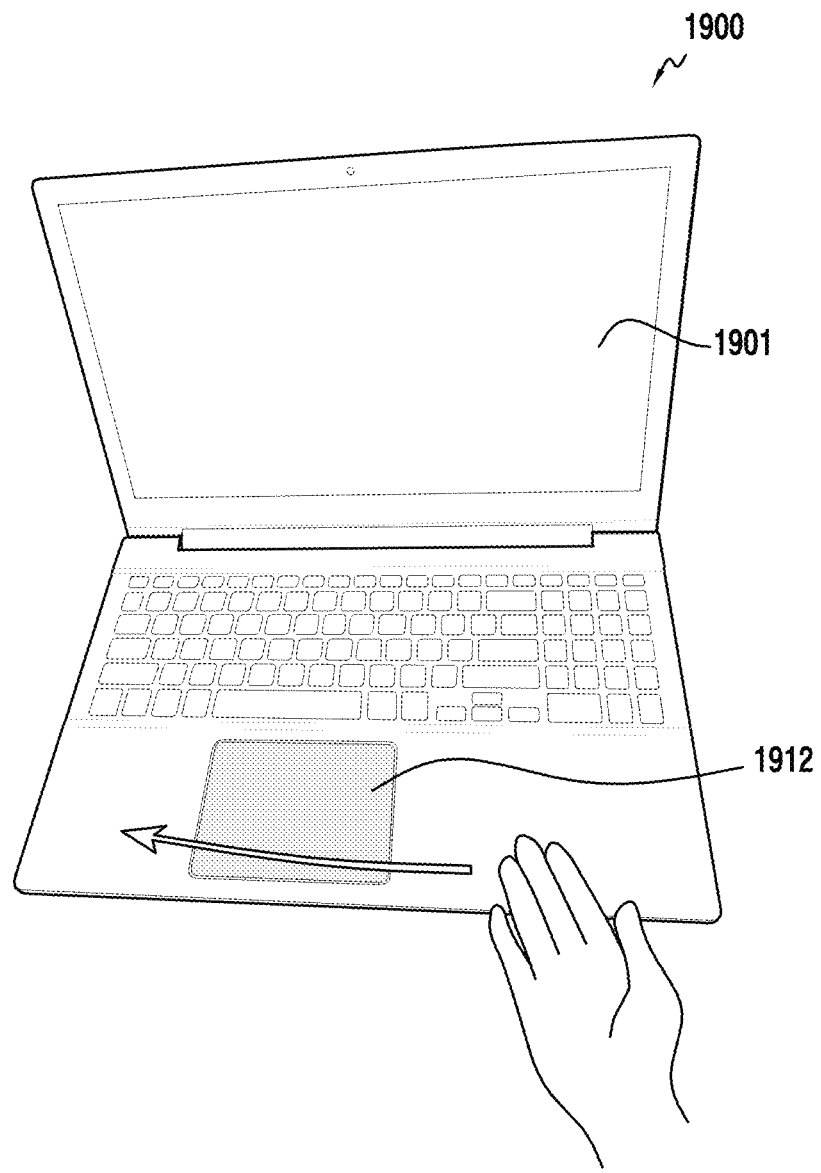
FIG. 19 illustrates an electronic device according to an embodiment of the present disclosure.

FIG. 19 depicts an electronic device 1900 according to an embodiment of the present disclosure. Electronic device 1900 may include a screen 1901 and an electromagnetic field input device 1912, and may be similar or identical to the electronic device 1400 of FIG. 14.

The screen 1901 may display contents (e.g., a webpage, an e-book, etc.).

The electromagnetic field input device 1912 (e.g., the electromagnetic field input device 1412 of FIG. 14) may include the input device of one of FIG. 1 through FIG. 11. For example, the user may move his/her hand left to right over the electromagnetic field input device 1912. The electromagnetic field input device 1912 may provide the non-contact touch input to the processor 1220 (not shown) of FIG. 12. The processor 1220 may recognize the gesture moving the hand left to right based on the non-contact touch input fed from the electromagnetic field input device 1912, and scroll contents of the screen 1901 from left to right.

According to an embodiment of the present disclosure, an electronic device 1201 of FIG. 12 may include a multi-layer panel 10 of FIG. 1, a first upper electrode 112A of FIG. 1 and a first lower electrode 113A of FIG. 1 disposed in different layers respectively of the multi-layer panel 10; a second upper electrode 110 of FIG. 1 and a second lower electrode 120 of FIG. 1 disposed in different layers respectively of the multi-layer panel 10; a first touch controller 12 of FIG. 1 for detecting a contact touch input using an electromagnetic field (e.g. detecting a change in the first electromagnetic field 1EF of FIG. 5) between the first upper electrode 112A and the first lower electrode 113A; and a second touch controller 13 of FIG. 1 for detecting a non-contact touch input using an electromagnetic field (e.g., detecting a change in the second electromagnetic field 2EF of FIG. 5) between the second upper electrode 110 and the second lower electrode 120.

The second upper electrode 610 of FIG. 6 may be disposed in the same layer 611 of FIG. 6 as the first upper electrode 611A of FIG. 6.

The second upper electrode 910 of FIG. 9 may be disposed in the same layer 912 of FIG. 9 as the first lower electrode 912A of FIG. 9.

The second upper electrode 1110 of FIG. 11 may be disposed in a layer (e.g., the third layer 1113) below a layer 1112 of FIG. 9 comprising the first lower electrode 1112A of FIG. 11.

The second upper electrode 610 of FIG. 6 may not overlap the first upper electrode 611A of FIG. 6 or the first lower electrode 612A of FIG. 6.

The second upper electrode 610 of FIG. 6 may be disposed on a rim (e.g., the second area 611S2) of a layer (e.g., the first layer 611 of FIG. 6).

The second lower electrode 620 of FIG. 6 may not overlap the first upper electrode 611A of FIG. 6 or the first lower electrode 612A of FIG. 6.

The second lower electrode 620 of FIG. 6 is disposed on a rim (e.g., the second area 612S2 of FIG. 6) of a layer (e.g., the second layer 612 of FIG. 6).

The second lower electrode 920 of FIG. 9 may be disposed in a rim of a layer (e.g., the third layer 913 of FIG. 9) and partially overlap the first upper electrode 911A of FIG. 9 or the first lower electrode 912A of FIG. 9.

At least one layer of the multi-layer panel 10 of FIG. 1 may be interposed between a layer comprising the first upper electrode and a layer comprising the first lower electrode.

At least one layer (e.g., the second layer 812 and the third layer 813 of FIG. 8) of the multi-layer panel 10 of FIG. 1 may be disposed between a layer (e.g., the first layer 811 of FIG. 8) comprising the second upper electrode 811A of FIG. 8 and a layer (e.g., the fourth layer 814 of FIG. 8) comprising the second lower electrode 820 of FIG. 8.

At least one layer (e.g., the third layer 613 of FIG. 6) of the multi-layer panel 10 of FIG. 1 may be disposed below a layer (e.g., the second layer 612 of FIG. 6) comprising the first lower electrode 620 of FIG. 6, and comprises a ground plane 613G of FIG. 6.

At least one layer (e.g., the fourth layer 614 of FIG. 6) of the multi-layer panel 10 of FIG. 1 may include a circuit board below a layer (e.g., the second layer 612 of FIG. 6) comprising the first lower electrode 612A of FIG. 6.

The multi-layer panel 10 of FIG. 1 may form at least part of one side 1410S of the electronic device 16 of FIG. 16.

The multi-layer panel 10 of FIG. 1 may form at least part of a screen 3001 of FIG. 17 of the electronic device 1600 of FIG. 16.

A keyboard 1411 of FIG. 14 may be disposed in one side 1410S of FIG. 14 of the electronic device 1400 of FIG. 14.

A processor 1220 of FIG. 12 may conduct at least one function corresponding to the contact touch input or the non-contact touch input.

An input control module 1270 of FIG. 12 may disable the first touch controller 12 of FIG. 1 or the second touch controller 13 of FIG. 1.

The input control module 1270 of FIG. 12 may disable the second touch controller 13 of FIG. 1 for the contact touch input, and disable the first touch controller 12 of FIG. 1 for the non-contact touch input.

A laptop computer may include an input device (e.g., the electromagnetic field input device 1412 of FIG. 14A) for providing a touch surface (e.g., the first input area 1412S1 and the second input area 1412S2 of FIG. 14) disposed in a side 1410S of the laptop computer (e.g., the electronic device 1400 of FIG. 14). The input device may include a multi-layer panel 10 of FIG. 1, a first upper electrode 112A of FIG. 1 and a first lower electrode 113A of FIG. 1 disposed in different layers respectively of the multi-layer panel 10; a second upper electrode 110 of FIG. 1 and a second lower electrode 120 of FIG. 1 disposed in different layers respectively of the multi-layer panel 10; a first touch controller 12 of FIG. 1 for detecting a contact touch input using an electromagnetic field (detecting a change in the first electromagnetic field 1EF of FIG. 5) between the first upper electrode 112A and the first lower electrode 113A; and a second touch controller 13 of FIG. 1 for detecting a non-contact touch input using an electromagnetic field (e.g., detecting a change in the second electromagnetic field 2EF of FIG. 5) between the second upper electrode 110 and the second lower electrode 120. The first electromagnetic field 1EF of FIG. 5 may be emitted through part (e.g., the first input side 1412S1 of FIG. 14) of the touch surface, and the second electromagnetic field 2EF of FIG. 5 may be emitted through the remaining touch surface (e.g., the second input side 1412S1 of FIG. 14).

Figure 20:
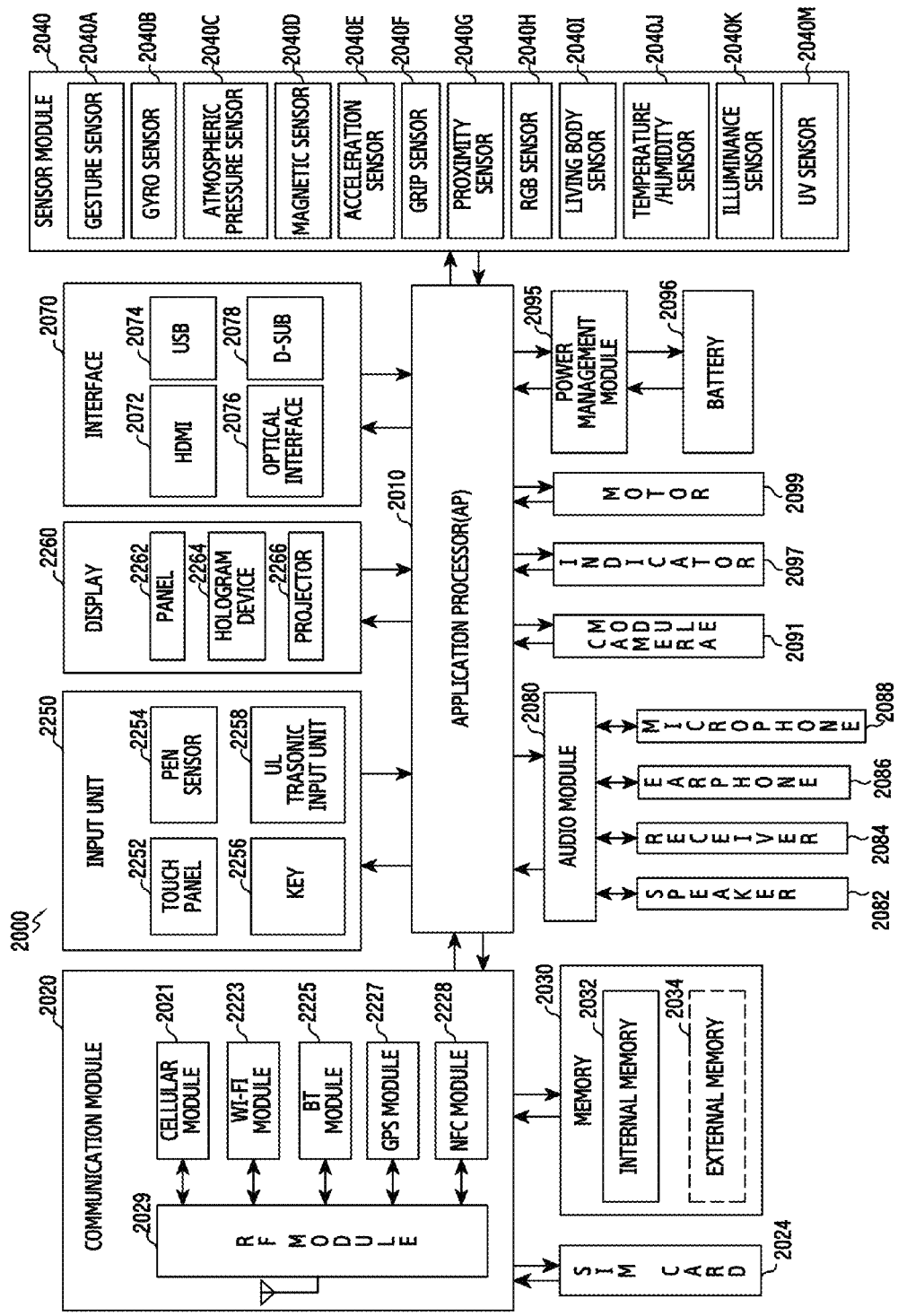
FIG. 20 illustrates an electronic device according to an embodiment of the present disclosure.

FIG. 20 is a block diagram of an electronic device according to an embodiment of the present disclosure. For example, an electronic device 2000 may configure all or part of the electronic device 1201 of FIG. 12. Electronic device 2000 may include one or more APs, a communication module 2020, a Subscriber Identification Module (SIM) card 2024, a memory 2030, a sensor module 2040, an input module 2050, a display 2060, an interface 2070, an audio module 2080, a camera module 2091, a power management module 2095, a battery 2096, an indicator 2097, and a motor 209.

The AP 2010 may control hardware or software components connected to the AP 2010 by driving an operating system or an application program, and process various data and operations including multimedia data. For example, the AP 2010 may be implemented using a System on Chip (SoC). The processor 2010 may further include a Graphics Processing Unit (GPU) (not shown).

The communication module 2020 may transmit and receive data in a communication between the electronic device 2000 (e.g., the electronic device 1201) and other electronic devices (e.g., the electronic device 1204 or the server 1206) connected over a network. The communication module 2020 may include a cellular module 2021, a Wifi module 2023, a BT module 2025, a GPS module 2027, an NFC module 2028, and a Radio Frequency (RF) module 2029.

The cellular module 2021 may provide a voice call, a video call, a text message service, or an Internet service over the communication network (e.g., LTE, LTE-A, CDMA, WCDMA, UMTS, WiBro, or GSM). Also, the cellular module 2021 may identify and authenticate an electronic device in the communication network using the SIM (e.g., the SIM card 2024). The cellular module 2021 may perform at least part of functions provided by the AP 2010. For example, the cellular module 2021 may perform at least part of a multimedia control function.

The cellular module 2021 may include a CP. The cellular module 2021 may be implemented using, for example, an SoC. While the components of the cellular module 2021 (e.g., the CP), the memory 2030, and the power management module 2095 are separated from the AP 2010 in FIG. 20, the AP 2010 may include at least part (e.g., the cellular module 2021) of the above-stated components.

The AP 2010 or the cellular module 2021 (e.g., the CP) may load and process the instruction or the data received from its connected non-volatile memory or at least one of the other components, in a volatile memory. Also, the AP 2010 or the cellular module 2021 may store data received from or generated by at least one of the other components, in the non-volatile memory.

The Wifi module 2023, the BT module 2025, the GPS module 2027, or the NFC module 2028 each may include, for example, a processor for processing the data transmitted and received via the corresponding module. While the cellular module 2021, the Wifi module 2023, the BT module 2025, the GPS module 2027, and the NFC module 2028 are separated from each other in FIG. 20, at least part (e.g., at least two) of the cellular module 2021, the Wifi module 2023, the BT module 2025, the GPS module 2027, and the NFC module 2028 may be included in a single Integrated Chip (IC) or an IC package. For example, at least part (e.g., the CP corresponding to the cellular module 2021 and the Wifi processor corresponding to the Wifi module 2023) of the processors corresponding to the cellular module 2021, the Wifi module 2023, the BT module 2025, the GPS module 2027, and the NFC module 2028 may be implemented using a single SoC.

The RF module 2029 may transmit and receive data, for example, RF signals. The RF module 2029 may include, for example, a transceiver, a Power Amp Module (PAM), a frequency filter, and a Low Noise Amplifier (LNA), which are not shown. Also, the RF module 2029 may further include a component, for example, a conductor or a conducting wire, for sending and receiving electromagnetic waves in free space during the wireless communication. While the cellular module 2021, the Wifi module 2023, the BT module 2025, the GPS module 2027, and the NFC module 2028 share the single RF module 2029 in FIG. 20, at least one of the cellular module 2021, the Wifi module 2023, the BT module 2025, the GPS module 2027, and the NFC module 2028 may transmit and receive the RF signals via a separate RF module.

The SIM card 2024 may be a card including the SIM and inserted to a slot formed at a specific location of the electronic device. The SIM card 2024 may include unique identification information (e.g., Integrated Circuit Card Identifier (ICCID)) or subscriber information (e.g., International Mobile Subscriber Identity (IMSI)).

The memory 2030 (e.g., the memory 1230) may include an internal memory 2032 or an external memory 2034. For example, the internal memory 2032 may include at least one of the volatile memory (e.g., Dynamic RAM (DRAM), Static RAM (SRAM), Synchronous Dynamic RAM (SDRAM)) and the non-volatile memory (e.g., One-Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

The internal memory 2032 may be a Solid State Drive (SSD). The external memory 2034 may include a flash drive, for example, a Compact Flash (CF), a Secure Digital (SD), a Micro-SD, a Mini-SD, an extreme digital (xD), or a memory stick. The external memory 2034 may be functionally connected to the electronic device 2000 via various interfaces. The electronic device 2000 may further include a storage device (or a storage medium) such as hard drive.

The sensor module 2040 may measure a physical quantity or detect an operation status of the electronic device 2000, and convert the measured or detected information to an electric signal. The sensor module 2040 may include at least one of, for example, a gesture sensor 2040A, a gyro sensor 2040B, an atmospheric pressure sensor 2040C, a magnetic sensor 2040D, an acceleration sensor 2040E, a grip sensor 2040F, a proximity sensor 2040G, a color sensor 2040H (e.g., an RGB sensor), a biometric sensor 2040I, a temperature/humidity sensor 2040J, a light sensor 2040K, or an UltraViolet (UV) sensor 2040M. Additionally or alternatively, the sensor module 2040 may include, for example, an E-noise sensor (not shown), an electromyography (EMG) sensor (not shown), an electroencephalogram (EEG) sensor (not shown), an electrocardiogram (ECG) sensor (not shown), an Infra Red (IR) sensor (not shown), an iris sensor (not shown), or a finger print sensor (not shown). The sensor module 2040 may further include a control circuit for controlling its one or more sensors.

The input device 2050 may include a touch panel 2052, a (digital) pen sensor 2054, a key 2056, or an ultrasonic input device 2058. For example, the touch panel 2052 may recognize touch input using at least one of capacitive, resistive, infrared, and ultrasonic wave techniques. Also, the touch panel 2052 may further include a controller. The capacitive type may recognize physical contact or proximity. The touch panel 2052 may further include a tactile layer. In this case, the touch panel 2052 may provide a tactile response to the user. The touch panel 2052 may include at least part of the input device shown in one of FIG. 1 through FIG. 11.

The (digital) pen sensor 2054 may be implemented using, for example, the same or similar method as or to the user's touch input, or using a separate recognition sheet. For example, the key 2056 may include, for example, a physical button, an optical key, or a keypad. The ultrasonic input device 2058 is a device capable of obtaining data by detecting microwaves through a microphone (e.g., a microphone 2088) in the electronic device 2000 through an input tool which generates an ultrasonic signal, allows radio frequency identification. The electronic device 2000 may receive user input from an external device (e.g., a computer or a server) connected using the communication module 2020. The pen sensor 2054 may include at least part of the input device shown in one of FIG. 1 through FIG. 11.

The display 2060 (e.g., the display 1250) may include a panel 2062, a hologram device 2064, or a projector 2066. The panel 2062 may employ, for example, an LCD or an AMOLED. The panel 2062 may be implemented, for example, flexibly, transparently, or wearably. The panel 2062 may be constructed as the single module with the touch panel 2052. The hologram device 2064 may present a three-dimensional image in the air using interference of light. The projector 2066 may display the image by projecting the light onto a screen. The screen may be placed, for example, inside or outside the electronic device 2000. The display 2060 may further include a control circuit for controlling the panel 2062, the hologram device 2064, or the projector 2066. The display 2060 may include at least part of the input device shown in one of FIG. 1 through FIG. 11.

The interface 2070 may include, for example, an HDMI 2072, a USB 2074, an optical interface 2076, or a D-subminiature (D-sub) 2078. The interface 2070 may be included in, for example, the communication interface 1260 of FIG. 12. Additionally or alternatively, the interface 2070 may include, for example, Mobile High-Definition Link (MHL) interface, SD card/Multi-Media Card (MMC) interface, or Infrared Data Association (IrDA) standard interface.

The audio module 2080 may convert sound to an electric signal and vice versa. At least part of the audio module 2080 may be included in, for example, the input/output interface 1240 of FIG. 12. The audio module 2080 may process sound information which is input or output through, for example, a speaker 2082, a receiver 2084, an earphone 2086, or the microphone 2088.

The camera module 2091 is a device for capturing a still picture and a moving picture, and may include one or more image sensors (e.g., a top sensor or a bottom sensor), a lens (not shown), an Image Signal Processor (ISP) (not shown), or a flash (e.g., LED or xenon lamp) (not shown).

The power management module 2095 may manage power of the electronic device 2000. The power management module 2095 may include, although not depicted, for example, a Power Management Integrated Circuit (PMIC), a charger Integrated Circuit (IC), or a battery or fuel gauge.

The PMIC may be mounted in, for example, an IC or a SoC conductor. The charging type may be divided to a wired type and a wireless type. The charger IC may charge the battery, and prevent overvoltage or overcurrent flow from the charger. The charger IC may include a charger IC for at least one of the wired charging type or the wireless charging type. The wireless charging type includes, for example, a magnetic resonance type, a magnetic induction type, or a microwave type, and may add an additional circuit for the wireless charging, for example, a circuit such as coil loop, resonance circuit, or rectifier.

The battery gauge may, for example, measure the remaining capacity of the battery 2096 and the voltage, the current, or the temperature of the charging. The battery 2096 may generate or store electricity, and supply the power to the electronic device 200 using the stored or generated electricity. The battery 2096 may include, for example, a rechargeable battery or a solar battery The indicator 2097 may display a specific status of the electronic device 2000 or its part (e.g., the AP 2010), for example, booting state, message state, or charging state. The motor 2099 may convert the electric signal to a mechanic vibration. Although it is not depicted, the electronic device 2000 may include a processing device (e.g., a GPU) for mobile TV support. The processing device for the mobile TV support may process media data in conformity to a standard, for example, Digital Multimedia Broadcasting (DMB), Digital Video Broadcasting (DVB), or media flow.

The aforementioned components of the electronic device according to various embodiments of the present disclosure each may include one or more components, and the name of the corresponding component may differ according to the type of the electronic device. The present electronic device may include at least one of the aforementioned components, omit some components, or further include other components. Also, some of the components of the present electronic device may be united into a single entity to thus carry out the same functions of the corresponding components.

The term "module" used in an embodiment of the present disclosure indicates, for example, a unit including a combination of one or more of hardware, software, or firmware. The "module" may be interchangeably used with the terms, for example, "a unit," "logic," "a logical block," "a component," or "a circuit." The "module" may be a minimum unit or part of the components integrally formed. The "module" may be a minimum unit or part of one or more functions. The "module" may be implemented mechanically or electronically. For example, the "module" may include at least one of an Application-Specific Integrated Circuit (ASIC), a Field-Programmable Gate Array (FPGA), or a programmable-logic device for performing operations which are well known or will be developed.

At least part of the device (e.g., the modules or the functions) or the method (e.g., the operations) described in the appended claims and/or the specification of the present disclosure may be implemented using, for example, instructions stored as the programming module in a non-transitory computer-readable storage medium. For example, when an instruction is executed by one or more processors (e.g., the processor 120), the one or more processors perform the corresponding function. The non-transitory computer-readable storage medium may be, for example, the memory 130. At least part of the programming module may be implemented (e.g., executed) by the processor 120. At least part of the programming module may include, for example, a module, a program, sets of instructions, or a process for performing one or more functions.

The non-transitory computer-readable recording medium may include magnetic media such as a hard disk, a floppy disk and a magnetic tape, an optical media such as a Compact Disc Read Only Memory (CD-ROM) and a Digital Versatile Disc (DVD), magneto-optical media such as a floptical disk, and hardware devices specifically configured to store and execute an application instruction (e.g., the programming module) such as a Read Only Memory (ROM), a Random Access Memory (RAM), and a flash memory. A program instruction may include not only machine code made by a compiler but also high-level language code executable by a computer using an interpreter. The above-stated electronic device may serve as one or more software modules for fulfilling the operations of an embodiment of the present disclosure, and vice versa.

The module or the programming module according to an embodiment of the present disclosure may include at least one of the aforementioned components, omit some components, or further include other components. The operations fulfilled by the modules, the programming modules, or other components may be carried out in sequence, in parallel, repeatedly, or heuristically. In addition, some operations may be executed in a different order or omitted, or other operations may be added.

As set forth above, since there is no need to mount an input device for detecting a non-contact touch input in the user device separately from the input device for detecting the contact touch input, the user device fabrication may be facilitated. In addition, the user may experience a new input method by applying the contact touch input or the non-contact touch input using the single input device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a multi-layer panel;
    a first upper electrode and a first lower electrode respectively comprised in different layers of the multi-layer panel;
    a second upper electrode and a second lower electrode respectively comprised in different layers of the multi-layer panel; and
    a controller configured to:
        detect a touch input by detecting a change for a first electromagnetic field generated based on the first upper electrode and the first lower electrode; and
        detect a non-touch input by detecting a change for a second electromagnetic field generated based on the second upper electrode and the second lower electrode,
        wherein intensity for the first electromagnetic field is smaller than intensity for the second electromagnetic field.

2. The electronic device of claim 1, wherein the second upper electrode is comprised in a layer comprising one of the first upper electrode and the first lower electrode.

3. The electronic device of claim 1, wherein a layer comprising the first lower electrode is disposed between a layer comprising the first upper electrode and a layer comprising the second upper electrode.

4. The electronic device of claim 1, wherein the second upper electrode is comprised in a portion of a layer of the multi-layer panel, and
    wherein one of the first upper electrode and the first lower electrode is comprised in another portion of the layer of the multi-layer panel.

5. The electronic device of claim 4, wherein the portion of the layer of the multi-layer panel comprises an edge area of the layer of the multi-layer panel.

6. The electronic device of claim 1, wherein the second lower electrode is comprised in a portion of a layer of the multi-layer panel, and
    wherein one of the first upper electrode and the first lower electrode is comprised in another portion of the layer of the multi-layer panel.

7. The electronic device of claim 6, wherein the portion of the layer of the multi-layer panel comprises an edge portion of a layer of the multi-layer panel.

8. The electronic device of claim 1, wherein the second lower electrode is comprised in an edge portion of a layer of the multi-layer panel,
    wherein one of the first upper electrode and the first lower electrode is comprised in a portion of the layer of the multi-layer panel, and
    wherein the edge portion at least overlaps with the portion.

9. The electronic device of claim 1, wherein at least one layer of the multi-layer panel is disposed between a layer comprising the first upper electrode and a layer comprising the first lower electrode.

10. The electronic device of claim 1, wherein at least one layer of the multi-layer panel is disposed between a layer comprising the second upper electrode and a layer comprising the second lower electrode.

11. The electronic device of claim 1, wherein at least one layer of the multi-layer panel is disposed below a layer comprising the first lower electrode, and comprises a ground plane.

12. The electronic device of claim 1, wherein at least one of the touch input and non-touch input is detected above the multi-layer panel, and at least one layer of the multi-layer panel comprises a circuit board below a layer comprising the first lower electrode.

13. The electronic device of claim 1, wherein the first upper electrode comprises x electrode lines spaced at equal distances in a y-axis direction, and the first lower electrode comprises y electrode lines spaced at equal distances in an x-axis direction.

14. The electronic device of claim 1, wherein the multi-layer panel forms at least part of one side of the electronic device.

15. The electronic device of claim 14, wherein the multi-layer panel forms at least part of a touch screen of the electronic device.

16. The electronic device of claim 14, further comprising:
   a processor for performing at least one function corresponding to at least one of the touch input and the non-touch input.

17. The electronic device of claim 1, wherein the controller comprises:
   a first controller configured to detect the touch input by detecting the change for the first electromagnetic field generated based on the first upper electrode and the first lower electrode;
   second controller configured to detect the non-touch input by detecting the change for the second electromagnetic field generated based on the second upper electrode and the second lower electrode; and
   an input control module configured to deactivate one of the first controller and the second controller.

18. The electronic device of claim 17, wherein the input control module configured to:
   if the touch input is detected, deactivate the second controller; and
   if the non-touch input is detected, deactivate the first controller.

19. The electronic device of claim 18, wherein,
   if duration for the non-touch input is greater than threshold duration, the input control module is configured to deactivate the first controller and the second controller; and
   wherein, if duration for the non-touch input is equal to or smaller than threshold duration, the input control module is configured to activate the second controller.

20. A method for operating an electronic device comprising a multi-layer panel, the method comprising:
   detecting a touch input by detecting a change for a first electromagnetic field generated based on a first upper electrode and a first lower electrode; and
   detecting a non-touch input by detecting a change for a second electromagnetic field generated based on a second upper electrode and a second lower electrode,
   wherein the first upper electrode and the first lower electrode respectively comprised in different layers of the multi-layer panel,
   wherein the second upper electrode and the second lower electrode respectively comprised in different layers of the multi-layer panel, and
   wherein intensity for the first electromagnetic field is smaller than intensity for the second electromagnetic field.

* * * * *